US010313904B2

(12) United States Patent
Moon et al.

(10) Patent No.: US 10,313,904 B2
(45) Date of Patent: Jun. 4, 2019

(54) METHOD AND APPARATUS FOR TRANSMITTING AND RECEIVING DATA IN WIRELESS COMMUNICATION SYSTEM SUPPORTING UNLICENSED BAND

(71) Applicant: Samsung Electronics Co., Ltd., Suwon-si, Gyeonggi-do (KR)

(72) Inventors: Jung-Min Moon, Suwon-si (KR); Sun-Heui Ryoo, Yongin-si (KR); Sung-Jin Lee, Bucheon-si (KR); Jung-Soo Jung, Seongnam-si (KR); Ra-Yeon Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 15/325,018

(22) PCT Filed: Apr. 22, 2016

(86) PCT No.: PCT/KR2016/004236
§ 371 (c)(1),
(2) Date: Jan. 9, 2017

(87) PCT Pub. No.: WO2016/171513
PCT Pub. Date: Oct. 27, 2016

(65) Prior Publication Data
US 2017/0215096 A1    Jul. 27, 2017

(30) Foreign Application Priority Data

Apr. 22, 2015  (KR) ........................ 10-2015-0056681

(51) Int. Cl.
*H04L 5/00* (2006.01)
*H04W 24/08* (2009.01)
(Continued)

(52) U.S. Cl.
CPC ............. *H04W 24/08* (2013.01); *H04L 5/001* (2013.01); *H04L 5/005* (2013.01); *H04L 5/0048* (2013.01);
(Continued)

(58) Field of Classification Search
None
See application file for complete search history.

(56) References Cited

U.S. PATENT DOCUMENTS

2014/0071919 A1   3/2014  Kitazoe et al.
2014/0219237 A1*  8/2014  Charbit ............... H04W 72/044
                                                                                    370/330
(Continued)

FOREIGN PATENT DOCUMENTS

KR    10-2014-0017517 A    2/2014

OTHER PUBLICATIONS

Ericsson, Overview and scope of Measurement gap enhancement for LTE study item, R4-151369, 3GPP TSG-RAN WG4 Meeting # 74bis, Apr. 13, 2015, Rio de Janiro, Brazil.
(Continued)

*Primary Examiner* — Brian S Roberts
(74) *Attorney, Agent, or Firm* — Jefferson IP Law, LLP

(57) ABSTRACT

The present disclosure relates to a 5G or pre-5G communication system for supporting a higher data transmission rate after a 4G communication system such as LTE. In a wireless communication system of the present disclosure, a method for receiving, by a base station, a measurement result of a terminal includes: a process for allocating at least one of a plurality of measurement gaps, set for measuring a licensed band, for the measurement of an unlicensed band; a process for transmitting activation instruction information that instructs the activation of a measurement gap for the allocated unlicensed band measurement; and a process for receiving, from the terminal, a measurement result for the unlicensed band measured in the activated measurement gap by the terminal.

18 Claims, 16 Drawing Sheets

(51) Int. Cl.
*H04W 24/10* (2009.01)
*H04L 5/14* (2006.01)
*H04W 72/12* (2009.01)
*H04W 16/14* (2009.01)

(52) U.S. Cl.
CPC .............. *H04L 5/14* (2013.01); *H04W 16/14* (2013.01); *H04W 24/10* (2013.01); *H04W 72/1268* (2013.01)

(56) References Cited

U.S. PATENT DOCUMENTS

| | | | | |
|---|---|---|---|---|
| 2014/0302865 | A1* | 10/2014 | Bai | H04W 24/10 455/452.1 |
| 2015/0049741 | A1* | 2/2015 | Chen | H04W 48/12 370/336 |
| 2015/0063150 | A1* | 3/2015 | Sadek | H04W 24/10 370/252 |
| 2015/0131536 | A1 | 5/2015 | Kaur et al. | |
| 2016/0014610 | A1* | 1/2016 | Wong | H04W 74/002 455/454 |
| 2017/0339592 | A1* | 11/2017 | Yi | H04B 17/327 |

OTHER PUBLICATIONS

Catt, Data and control signaling transmission for LAA, R1-150113, 3GPP TSG RAN WG1 Meeting #80, Feb. 18, 2015, Athens, Greece.
Huawei et al., RRM/CSI measurement and feedback for unlicensed carrier, R1-150047, 3GPP TSG RAN WG1 Meeting #80, Feb. 18, 2015, Athens, Greece.

* cited by examiner

METHOD AND APPARATUS FOR TRANSMITTING AND RECEIVING DATA IN WIRELESS COMMUNICATION SYSTEM SUPPORTING UNLICENSED BAND

PRIORITY

This application is a National Stage Entry of PCT International Application No. PCT/KR2016/004236, which was filed on Apr. 22, 2016, and claims priority to Korean Patent Application No. 10-2015-0056681, which was filed on Apr. 22, 2015, the contents of which are incorporated herein by reference.

TECHNICAL FIELD

The present disclosure relates to a method and an apparatus for measuring a channel and transmitting and receiving data in a wireless communication system supporting an unlicensed band.

BACKGROUND ART

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond 4G network communication system or a post Long Term Evolution (LTE) system.

To achieve a high data transmission rate, implementing a 5G communication system in an extremely high frequency (mmWave) band (for example, a 60 GHz band) is considered. To relieve the path loss of signals and to increase the transmission distance of signals in an extremely high frequency band, beamforming, massive Multiple-Input And Multiple-Output (massive MIMO), Full Dimensional MIMO (FD-MIMO), array antenna, analog beamforming, and large scale antenna techniques are under discussion for a 5G communication system.

Further, to improve the network of the system, technical development in an evolved small cell, an advanced small cell, a cloud Radio Access Network (cloud RAN), an ultra-dense network, Device to Device (D2D) communication, wireless backhaul, a moving network, cooperative communication, Coordinated Multi-Points (COMP), and interference cancellation is progressing for the 5G communication system.

In addition, an Advanced Coding Modulation (ACM) scheme including Hybrid Frequency Shift Keying and Quadrature Amplitude Modulation (FQAM) and Sliding Window Superposition Coding (SWSC) as well as an advanced access technique including Filter Bank Multi Carrier (FBMC), Non Orthogonal Multiple Access (NOMA), and Sparse Code Multiple Access (SCMA) are developing in the 5G system.

As the amount of mobile traffic has explosively increased with the introduction of smartphones, communication services are provided using an unlicensed band that is not licensed for a specific mobile network carrier, such as a Wireless Local Area Network (WLAN) or Bluetooth. A WLAN established with low costs uses an unlicensed band and thus is viewed as a major solution for cellular companies that have difficulty in dealing with traffic only with a cellular network.

For reference, a "licensed band" refers to a frequency resource licensed for a specific mobile network carrier, which is a frequency resource allocated for a particular purpose, that is, exclusively for LTE. Meanwhile, an "unlicensed band" refers to a communication frequency band that is not licensed for a specific mobile network carrier and is a shared band reserved for the general public. An unlicensed band may be used representatively for industrial, scientific, and medical communications. A WLAN (Wi-Fi) and Bluetooth are representative communication services using unlicensed bands. An unlicensed band may be available for any device that satisfies prescribed regulations and conditions for the use of the unlicensed band.

That is, when it is difficult to accommodate subscriber traffic in an area with a large floating population only with cellular base stations, most cellular network carriers induce subscribers to be provided with communication services through a WLAN Access Point (AP) by directly establishing a WLAN or in partnership with existing WLAN operators.

Meanwhile, a WLAN installed by a mobile network carrier to relieve traffic is a network that is basically different in feature from a cellular network. Therefore, the WLAN is insufficient to provide telecommunications subscribers with mobility or security, as if installing a cellular base station. Thus, a method is being studied that enables mobile network carriers to provide subscribers with mobile communication services by directly using a cellular radio technology in an unlicensed band that is not licensed to the mobile network carriers, instead of using an initial method of installing a WLAN AP, and discussions on Long Term Evolution-Unlicensed (LTE-U) are being conducted based on this concept.

An LTE-U system is a system in which a user equipment (UE) and a base station use carriers or channels existing in both a licensed band and an unlicensed band.

FIG. 1 is a view illustrating the concept of a UE using both a licensed band and an unlicensed band in LTE-U.

Referring to FIG. 1, the cellular UE 101 may use both the licensed band 103 and the unlicensed band 105. Further, a carrier in the licensed band 103 and a carrier in the unlicensed carrier 105 may coexist 107 using a carrier aggregation (CA) method 107.

DETAILED DESCRIPTION OF THE INVENTION

Technical Problem

The present disclosure provides a method and an apparatus for measuring a channel between a base station and a UE in a Long Term Evolution-Unlicensed (LTE-U) system supporting an unlicensed band.

The present disclosure provides a method and an apparatus in which a base station transmits a reference signal through a downlink of an unlicensed band in an LTE-U system supporting the unlicensed band.

The present disclosure provides a method and an apparatus in which a user equipment (UE) receives a cell-specific reference signal through a downlink of an unlicensed band to measure a channel in an LTE-U system supporting the unlicensed band.

The present disclosure provides a method and an apparatus in which a base station and a UE transmit and receive data through an uplink of an unlicensed band in an LTE-U system supporting the unlicensed band.

The present disclosure provides a method and an apparatus in which a UE receives a channel quality reference signal through a downlink of an unlicensed band to measure a channel in an LTE-U system supporting the unlicensed band.

Technical Solution

According to an embodiment of the present disclosure, there is provided a method for a base station to receive a measurement result of a user equipment (UE) in a wireless communication system, the method including: allocating, for the measurement of an unlicensed band, at least one of a plurality of measurement gaps set for measurement of a licensed band; transmitting an activation command to activate the allocated measurement gap for the measurement of the unlicensed band; and receiving, from the UE, a measurement result of the unlicensed band that is measured by the UE in the activated measurement gap.

According to an embodiment of the present disclosure, there is provided a method of measuring a channel in a wireless communication system, the method including: setting a subframe as an uplink subframe for channel measurement of an unlicensed band when the strength of an interference signal received by a base station in the subframe through a channel in the unlicensed band is greater than a first value and is a second value or less; transmitting a virtual uplink indicator that indicates a configuration of the uplink subframe; receiving an uplink signal through the channel in the unlicensed band in the set uplink subframe; and measuring a state of a channel between the base station and the UE using the received uplink signal.

According to an embodiment of the present disclosure, there is provided a method for a base station to receive a measurement result of a UE in a wireless communication system, the method including: transmitting Channel State Information Reference Signal (CSI-RS) configuration information on at least one unlicensed-band channel to the UE; transmitting the CSI-RS through the at least one unlicensed-band channel based on the CSI-RS configuration information; transmitting, to the UE, use and transmission state information indicating whether the at least one unlicensed-band channel is used and whether the CSI-RS is transmitted through the unlicensed-band channel; and receiving a measurement result of the CSI-RS measured by the UE from the UE based on the CSI-RS information and the use and transmission state information.

According to an embodiment of the present disclosure, there is provided a method for a base station to receive a measurement result of a UE in a wireless communication system, the method including: receiving a request for transmission of a Channel State Information Reference Signal (CSI-RS) in a predetermined time interval through an unlicensed-band channel from the UE; transmitting the CSI-RS to the UE through the unlicensed-band channel during the predetermined time interval; and receiving a measurement result of the CSI-RS from the UE.

According to an embodiment of the present disclosure, there is provided a measurement method of a UE in a wireless communication system, the method including: receiving, from a base station, an activation command to activate at least one measurement gap allocated for the measurement of an unlicensed band among a plurality of measurement gaps set for the measurement of a licensed band; measuring the unlicensed band in the activated measurement gap; and transmitting a result of the measurement to the base station.

According to an embodiment of the present disclosure, there is provided a method of transmitting an uplink signal in a wireless communication system, the method including: receiving, from a base station, a virtual uplink indicator indicating a subframe set as an uplink subframe; and transmitting an uplink signal through the unlicensed-band channel in the set uplink subframe, wherein the base station sets the subframe as the uplink subframe for channel measurement of the unlicensed band when the strength of an interference signal received in the subframe through a unlicensed-band channel is greater than a first value and is a second value or less, and the transmitted uplink signal is used to measure a state of a channel between the base station and the UE.

According to an embodiment of the present disclosure, there is provided a measurement method of a UE in a wireless communication system, the method including: receiving Channel State Information Reference Signal (CSI-RS) configuration information on at least one unlicensed-band channel from a base station; receiving the CSI-RS through the at least one unlicensed-band channel based on the CSI-RS configuration information; receiving, from the base station, use and transmission state information indicating whether the at least one unlicensed-band channel is used and whether the CSI-RS is transmitted through the unlicensed-band channel; and transmitting a measurement result of the CSI-RS measured by the UE to the base station based on the CSI-RS information and the use and transmission state information.

According to an embodiment of the present disclosure, there is provided a measurement method of a UE in a wireless communication system, the method including: transmitting a request for transmission of a Channel State Information Reference Signal (CSI-RS) in a predetermined time interval through an unlicensed-band channel to a base station; receiving the CSI-RS through the unlicensed-band channel during the predetermined time interval; measuring the CSI-RS; and transmitting a result of the measurement to the base station.

According to an embodiment of the present disclosure, there is provided a base station device for receiving a measurement result of a UE in a wireless communication system, the base station device including: a controller that allocates, for the measurement of an unlicensed band, at least one of a plurality of measurement gaps set for measurement of a licensed band; a signal generator that generates an activation command to activate the allocated measurement gap for the measurement of the unlicensed band; and a transceiver that transmits the activation command to the UE and receives, from the UE, a measurement result of the unlicensed band that is measured by the UE in the activated measurement gap.

According to an embodiment of the present disclosure, there is provided a base station device for measuring a channel in a wireless communication system, the base station device including: a controller that sets a subframe as an uplink subframe for channel measurement of an unlicensed band when the strength of an interference signal received in the subframe through a channel in the unlicensed band is greater than a first value and is a second value or less; a signal generator that generates a virtual uplink indicator that indicates a configuration of the uplink subframe; and a transceiver that transmits the generated virtual uplink indicator to a UE and receives an uplink signal through the channel in the unlicensed band in the set uplink subframe, wherein the controller measures a state of a channel between the base station and the UE using the received uplink signal.

According to an embodiment of the present disclosure, there is provided a base station device for receiving a measurement result of a UE in a wireless communication system, the base station device including: a signal generator that generates Channel State Information Reference Signal (CSI-RS) configuration information on at least one unlicensed-band channel to transmit the CSI-RS configuration information to the UE, transmits the CSI-RS to the UE through the at least one unlicensed-band channel based on the CSI-RS configuration information, and generates use and transmission state information indicating whether the at least one unlicensed-band channel is used and whether the CSI-RS is transmitted through the unlicensed-band channel to transmit the use and transmission state information to the UE; a transceiver that transmits signals generated in the signal generator to the UE; and a controller that receives a measurement result of the CSI-RS measured by the UE from the UE through the transceiver based on the CSI-RS information and the use and transmission state information.

According to an embodiment of the present disclosure, there is provided a base station device for receiving a measurement result of a UE in a wireless communication system, the base station device including: a controller that receives a request for transmission of a Channel State Information Reference Signal (CSI-RS) in a predetermined time interval through an unlicensed-band channel from the UE, transmits the CSI-RS to the UE through the unlicensed-band channel during the predetermined time interval, and receives a measurement result of the CSI-RS from the UE; and a transceiver that performs signal transmission and reception with the UE.

According to an embodiment of the present disclosure, there is provided a UE device for performing measurement in a wireless communication system, the UE device including: a controller that receives, from a base station, an activation command to activate at least one measurement gap allocated for measurement of an unlicensed band among a plurality of measurement gaps set for the measurement of a licensed band; a measurement unit that measures the unlicensed band in the activated measurement gap; and a transceiver that transmits a result of the measurement to the base station.

According to an embodiment of the present disclosure, there is provided a UE device for transmitting an uplink signal in a wireless communication system, the UE device including: a controller that receives, from a base station, a virtual uplink indicator indicating a subframe set as an uplink subframe; and a transceiver that transmits an uplink signal through the unlicensed-band channel in the set uplink subframe, wherein the base station sets the subframe as the uplink subframe for channel measurement of the unlicensed band when strength of an interference signal received in the subframe through an unlicensed-band channel is greater than a first value and is a second value or less, and the transmitted uplink signal is used to measure a state of a channel between the base station and the UE.

According to an embodiment of the present disclosure, there is provided a UE device for performing measurement in a wireless communication system, the UE device including: a transceiver that receives Channel State Information Reference Signal (CSI-RS) configuration information on at least one unlicensed-band channel from a base station, receives the CSI-RS through the at least one unlicensed-band channel based on the CSI-RS configuration information, and receives, from the base station, use and transmission state information indicating whether the at least one unlicensed-band channel is used and whether the CSI-RS is transmitted through the unlicensed-band channel; and a measurement unit that measures the CSI-RS and transmits a result of the measurement to the base station through the transceiver, based on the CSI-RS information and the use and transmission state information.

According to an embodiment of the present disclosure, there is provided a UE device for performing measurement in a wireless communication system, the UE device including: a transceiver that transmits a request for transmission of a Channel State Information Reference Signal (CSI-RS) in a predetermined time interval through an unlicensed-band channel to a base station and receives the CSI-RS through the unlicensed-band channel during the predetermined time interval; and a measurement unit that measures the CSI-RS and transmits a result of the measurement to the base station through the transceiver.

MODE FOR CARRYING OUT THE INVENTION

Figure 1:
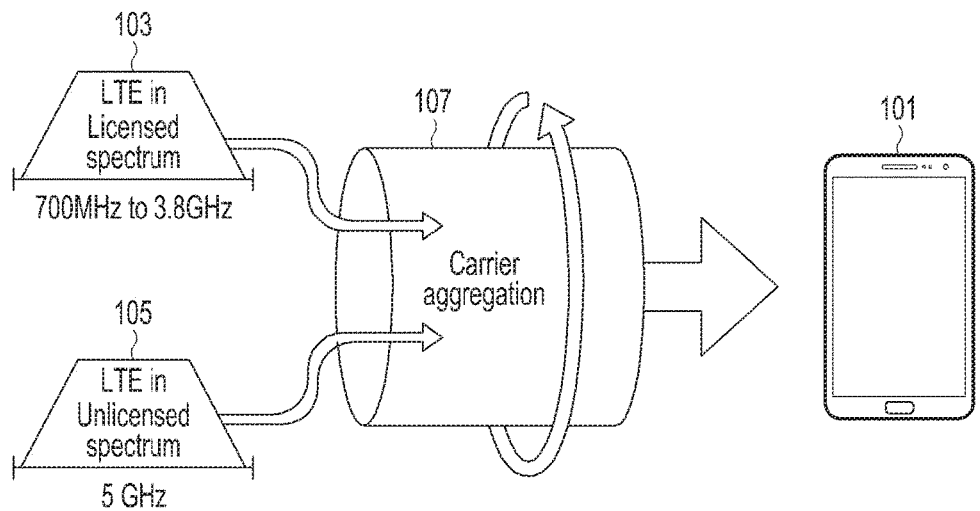
FIG. 1 is a view illustrating the concept of a UE using both a licensed band and an unlicensed band in LTE-U.

In the following description of the present disclosure, a detailed description of known configurations or functions incorporated herein will be omitted when it is determined that the detailed description may make the subject matter of the present disclosure unclear. Hereinafter, embodiments of the foregoing present disclosure will be described in detail with reference to the accompanying drawings.

Although embodiments of the present disclosure described below will be divided for the convenience of description, two or more embodiments may be combined within the range where the embodiments do not collide each other.

Terms used herein are defined in consideration of functions in the embodiments of the present disclosure and may be changed according to a user equipment (UE), the intent of an operator, or a custom. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. Throughout the specification, the terms such as "comprise" or "include" should not be construed as necessarily including all of the various component or steps described in the specification. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Hereinafter, various embodiments will be described with reference to the accompanying drawings. It should be noted that the same elements will be designated by the same reference numerals although they are shown in different drawings. Further, in the following description of the present disclosure, a detailed description of known functions and configurations incorporated herein will be omitted when it may make the subject matter of the present disclosure rather unclear. In the following description, it is noted that only structural elements necessary for understanding operations according to various embodiments will be described, and the description of the other elements will be omitted in order to prevent obscuring of the subject matter of the present disclosure.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

First, prior to describing the present disclosure, regulations for using an unlicensed band are described briefly.

In order for a cellular device to efficiently use an unlicensed band in an LTE-U system, the coexistence of the cellular device with a Wi-Fi device as a representative device using an unlicensed band is important. According to one of the regulations for using the unlicensed band, a transmitter needs to perform a Listen Before Talk (LBT) or Clear Channel Assessment (CCA) operation before using an unlicensed band.

The LBT or CCA is a procedure in which a UE or a base station identifies whether another node occupies a channel in the unlicensed band before transmitting an uplink or downlink signal. Here, the transmitter may determine whether the other node occupies the channel by measuring the strength of an interference signal received by the transmitter.

In the CCA operation, for example, the transmitter determines that the channel is occupied by the other node when the strength of the interference signal received by the transmitter is a predetermined CCA threshold; and determines that the channel is not occupied by any node when interference received by the transmitter is less than the CCA threshold. That is, according to the CCA regulation, the transmitter is allowed to transmit data through the channel only when the strength of the interference signal received by the transmitter is less than the CCA threshold.

Meanwhile, in LTE-U, the UE receives a Cell-specific Reference Signal (CRS) transmitted by the base station at least one or more times to calculate an average received signal value of the received CRSs and needs to determine whether to add or remove the channel according to whether the average received signal value is a predetermined threshold or higher. That is, when an additional channel for data transmission is needed and the UE receives the CRS via a channel that is not currently occupied by the UE, if a received signal strength value is the predetermined threshold or higher, the UE adds the channel. However, when the received signal value of the CRS via a channel currently occupied by the UE is less than the threshold, the UE may remove the channel and may not use the channel any more.

To enable the foregoing operation, an LTE-U base station (hereinafter, abbreviated to "base station") needs to transmit a CRS at a time arranged in advance with a UE. However, it is impossible that the LTE-U base station always transmits a CRS at a specific time via a channel in an unlicensed band, because a Wi-Fi device using the channel transmits a signal at a random time without considering LTE-U. The base station receives an interference signal due to a transmission signal from the Wi-Fi device.

When the base station measures the strength of the interference signal, which is greater than a predetermined CCA threshold, the base station determines that the unlicensed channel is in a busy state. Accordingly, the base station is not allowed to transmit any downlink signal including a CRS through the unlicensed channel. Therefore, the UE may not identify the strength of a signal received from the base station and may consequently not establish a basis to add or remove a channel. For reference, this situation does not occur in LTE operating in a licensed band, because an LTE base station always transmits a CRS regardless of whether there is data in the channel, and there is no node that interrupts a transmission by the base station, such as a Wi-Fi device.

Hereinafter, LBT and CCA regulations are described in terms of the efficient use of frequency resources.

In a Time Division Duplex (TDD)-mode operation in LTE, an uplink subframe and a downlink subframe are repeated in a certain pattern. If uplink/downlink configurations defined in the LTE standard are applied to LTE-U operating in an unlicensed band as it is, efficiency in using LTE-U frequency resources may be reduced.

Specifically, suppose that a base station determines that an unlicensed-band channel is occupied for a specific LTE-U downlink subframe. Here, the base station is not allowed to transmit any downlink signal in the downlink subframe through the unlicensed-band channel, which results in the waste of the downlink subframe. For reference, in an LTE-U system, a different CCA threshold is set for each bandwidth. Specifically, when the LTE-U system uses a 20-MHz bandwidth, the CCA threshold is −62 dBm; when the LTE-U system uses a 10-MHz bandwidth, the CCA threshold is −65 dBm; and when the LTE-U system uses a 5-MHz bandwidth, the CCA threshold is −68 dBm. For example, in the LTE-U system using a 20-MHz bandwidth, when the base station detects an interference signal with a strength of −62 dBm or higher, the base station may not perform downlink transmission through the channel.

As described above, when the base station determines that the unlicensed channel is occupied in the downlink subframe and thus it is impossible to perform downlink transmission in the channel, uplink transmission and reception may be considered as an alternative. An interference signal value corresponding to a CCA threshold is not a negligible value for the base station. However, the interference signal value is not generally considered as a very high value for the base station. Therefore, when the strength of an interference received by the base station is the CCA threshold or higher but is not extremely greater than a certain reference value, the base station may have a possibility of successfully receiving an uplink signal. However, when downlink subframes and uplink subframes are statically managed as in the uplink/downlink configurations defined in the existing LTE standard, the base station may not receive an uplink signal in the channel.

Hereinafter, embodiments of the present disclosure are described in detail.

The following present disclosure illustrates a measurement method using a CRS in an unlicensed band in an LTE-U system, a method for performing uplink transmission and reception in LTE-U to improve efficiency in the use of a frequency in an unlicensed band, and a channel measurement method using a CSI-RS in an unlicensed band.

<Measurement Method Using CRS in Unlicensed Band>

Hereinafter, measurement methods to be applied in LTE-U suggested in the present disclosure are described.

Prior to describing a measurement method suggested in the present disclosure, a measurement operation defined in the LTE standard is described.

In an LTE system, while performing communication with a serving base station, a UE periodically moves to a different frequency from a currently serving frequency and measures the signal quality of a channel or a base station operating at the different frequency, which is called inter-frequency measurement. Inter-frequency measurement is performed for 6 ms per 40-ms (80-ms) period. A measurement interval of 6 ms is referred to as a measurement gap. The UE measures the signal quality of another channel during the measurement gap and determines whether to use a channel with a signal quality of a threshold or higher according to a quality measurement result.

Hereinafter, it is described that a measurement method defined in the foregoing existing LTE standard is applied to an LTE-U unlicensed-band channel as it is.

Figure 2:
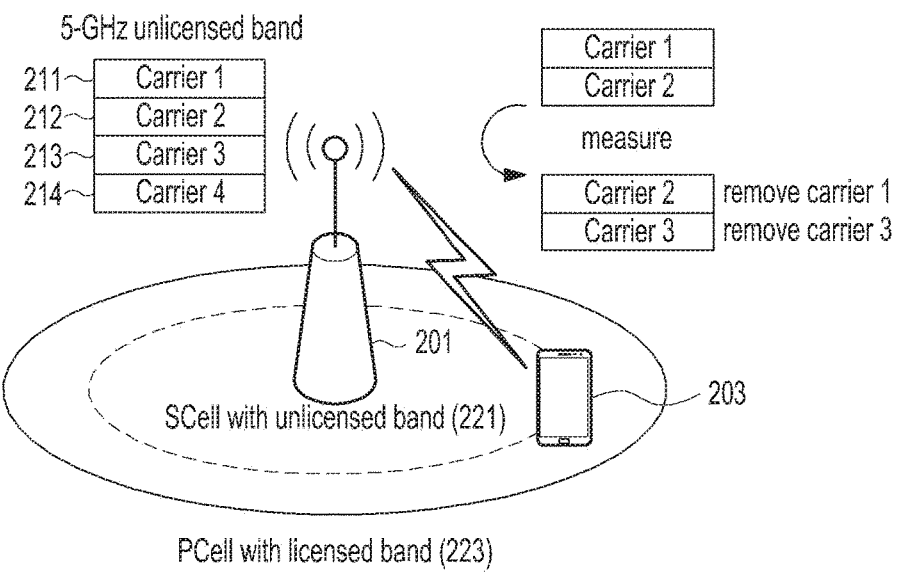
FIG. 2 is a view illustrating that a channel may be added/removed through the measurement of an LTE unlicensed-band channel.

FIG. 2 is a view illustrating an example in which an existing LTE measurement method is applied in an LTE-U unlicensed-band channel.

Referring to FIG. 2, a base station 201 may communicate using a P (Primary) cell 223 using a licensed band and an S cell 221 using an unlicensed band. It is assumed that the unlicensed band includes four carriers 211, 212, 213, and 214. Although not shown, a Wi-Fi device may use the carriers in the unlicensed band.

Referring to FIG. 2, the base station 201 performs a CCA operation on a channel (or carrier) in the unlicensed band, and adds the channel when the channel has a received signal strength value of a predetermined threshold or higher. FIG. 2 illustrates that a channel using carrier 3 213 is added. Further, when the current base station 201 performs a CCA operation on carrier 1 211 and an interference signal is a CCA threshold or less as a result, the base station 201 removes a channel using carrier 1 211. FIG. 2 illustrates that carrier 1 211 is removed.

As described above, in LTE-U using both a channel in a licensed band and a channel in an unlicensed band, when a base station performs a CCA operation on a specific channel in the unlicensed band and the strength of an interference signal is a CCA threshold or higher as a result, the base station determines that the channel is occupied (by another device). Therefore, the base station may not perform downlink transmission through the channel in the unlicensed band. The base station may not perform downlink transmission and thus may not transmit not only downlink data but also a CRS for channel measurement by a UE. In this regard, when a UE stipulated in an LTE system performs a measurement operation in an LTE-U system, the following situations may occur.

Case 1 is a case in which the base station detects that both a serving channel and a neighboring channel are in the busy state during a measurement gap, and thus transmits no CRS. In this case, since the serving channel is in the busy state, the UE may not receive downlink data through the serving channel. Therefore, the UE has no performance loss even though performing inter-frequency measurement. However, since the neighboring channel is also in the busy state, no CRS is currently transmitted. Thus, the UE may not measure the signal quality of the neighboring channel during the measurement gap.

Case 2 is a case in which the base station detects that both the serving channel and the neighboring channel are in an idle state during the measurement gap and thus transmits a CRS. In this case, the UE may receive downlink data through the serving channel. Thus, the UE may have performance loss when performing inter-frequency measurement. However, since the neighboring channel is currently transmitting the CRS, the UE may measure the signal quality of the neighboring channel during the measurement gap.

Case 3 is a case in which the base station transmits a CRS through the serving channel, which is in the idle state during the measurement gap, and transmits no CRS through the neighboring channel, which is in the busy state during the measurement gap. In this case, when the UE performs inter-frequency measurement in a state where the UE may receive downlink data through the serving channel, the UE may have performance loss. Meanwhile, since the neighboring channel is in the busy state and thus is not currently transmitting a CRS, the UE may not measure the signal quality of the neighboring channel during the measurement gap.

Case 4 is a case in which the base station transmits no CRS through the serving channel, which is in the busy state during the measurement gap, and transmits a CRS through the neighboring channel, which is in the idle state during the measurement gap. In this case, since the serving channel is in the busy state, the UE may not receive downlink data through the serving channel. Thus, the UE has no performance loss even though performing inter-frequency measurement. Meanwhile, since the base station is currently transmitting a CRS through the neighboring channel, the UE may measure the signal quality of the neighboring channel during the measurement gap.

Among the foregoing four cases, case 4 is the most suitable situation for the UE to perform inter-frequency measurement, in which the base station transmits no CRS through the serving channel but transmits a CRS through the neighboring channel.

That is, when the measurement operation defined in the current LTE standard is applied to the LTE-U system as it is, not only case 4 but case 1 to case 3 may also occur. When inter-frequency measurement is performed in case 1 to case 3, inefficiency occurs, for example, deterioration in the performance of the UE and power consumption for a radio frequency shift for inter-frequency measurement. Such inefficiency occurs because the measurement operation defined in the current LTE standard are based on the assumption that the base station regularly transmits a CRS at certain intervals, while LTE-U includes another node, that is, a Wi-Fi device, follows the LBT and CCA regulations, and thus does not allow the base station to regularly transmit a CRS as the LTE system does.

Hereinafter, measurement methods suggested in the present disclosure are described to resolve an inefficiency in applying the measurement method of the LTE system directly to LTE-U.

A first measurement method is an "activation command"-based measurement method in which a base station transmits, to a UE, an activation command to activate part of a plurality of measurement gaps set in the LTE system and the UE performs a measurement operation in an activated measurement gap.

A second measurement method is a proximity-based measurement method.

A third measurement method is an uplink signal-based measurement method.

Hereinafter, the activation command-based measurement method as the first measurement method is described.

The present disclosure suggests a method in which in LTE-U, a base station adaptively activates a measurement gap and transmits an "activation command" including information on the activated measurement gap to a UE, and the UE performs measurement according to the activation command.

Figure 3:
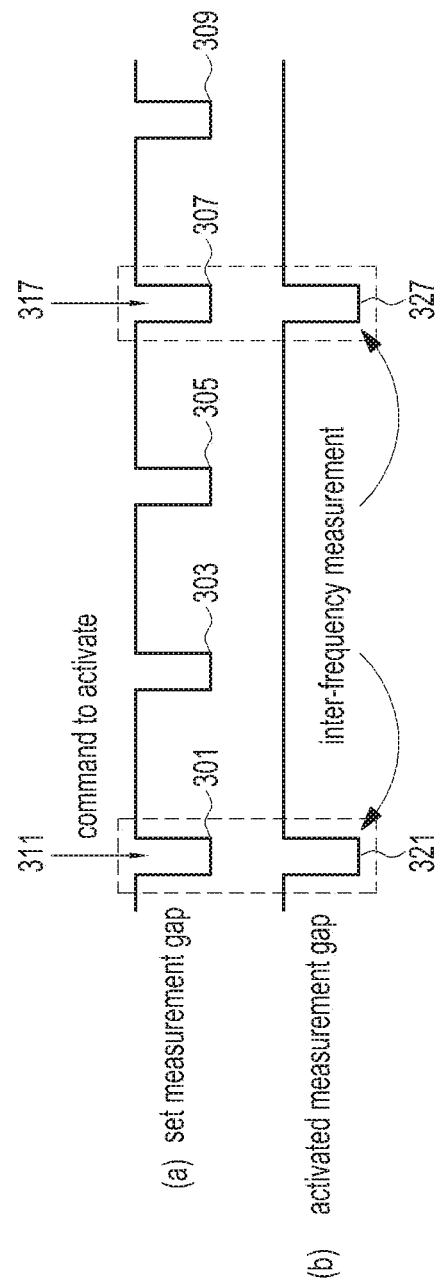
FIG. 3 is a view illustrating a measurement gap adaptively set based on an activation command according to an embodiment of the present disclosure.

FIG. 3 is a view illustrating a measurement gap adaptively set based on an activation command according to an embodiment of the present disclosure.

Referring to (a), the present disclosure activates some measurement gaps 301 and 307 among measurement gaps 301, 303, 305, and 307 set at a predetermined interval in the existing LTE system through activation commands 311 and 317.

(b) illustrates measurement gaps 321 and 327 activated through the activation commands in (a). In the present disclosure, a UE performs inter-frequency measurement in the activated measurement gaps 321 and 327.

Meanwhile, a base station transmits the activation commands to the UE. The activation commands are information indicating whether the corresponding measurement gaps are activated and may be, for example, a value in a 1-bit flag form.

Further, the base station may transmit "UE measured-channel information" indicating a channel to be measured by the UE and "CRS transmitted-channel information" indicating a channel currently used for the base station to transmit a CRS. The UE measured-channel information" may be center frequency information on the channel or index information on the channel. Meanwhile, the "CRS transmitted-channel information" may be center frequency information on the channel used to transmit the CRS or index information on the channel. Further, the "CRS transmitted-channel information" may be bitmap-format information indicating with 1-bit information whether the CRS is transmitted through each channel in an unlicensed band.

When the activation commands are received, the UE performs inter-frequency measurement in the measurement gaps indicated by the activation commands. Here, the UE needs to know how the measurement gaps indicated by the activation commands are set. To this end, the base station transmits, to the UE, configuration information on the set measurement gaps before transmitting the activation commands. Here, the configuration information on the measurement gaps includes at least one of the lengths of the measurement gaps, the repetition periods of the measurement gaps, and offset information on the measurement gaps.

Meanwhile, the base station may set a measurement gap for UEs in a cell using various methods. Examples of setting a measurement gap are illustrated as follows.

First, the base station may set an independent measurement gap for each UE in the cell. In this case, since a separate measurement gap may be set for each UE, the base station may transmit the activation commands to each UE through a predetermined control channel, for example, PDCCH, in a unicast mode. Second, the base station may set the same measurement gap for all UEs in the cell. In this case, the base station may transmit the activation commands in a broadcast mode. Third, the base station may classify the UEs in the cell into at least two groups and may set a measurement gap for each group. In this case, the base station may transmit the activation commands to UEs in each group in a multicast mode.

Figure 4:
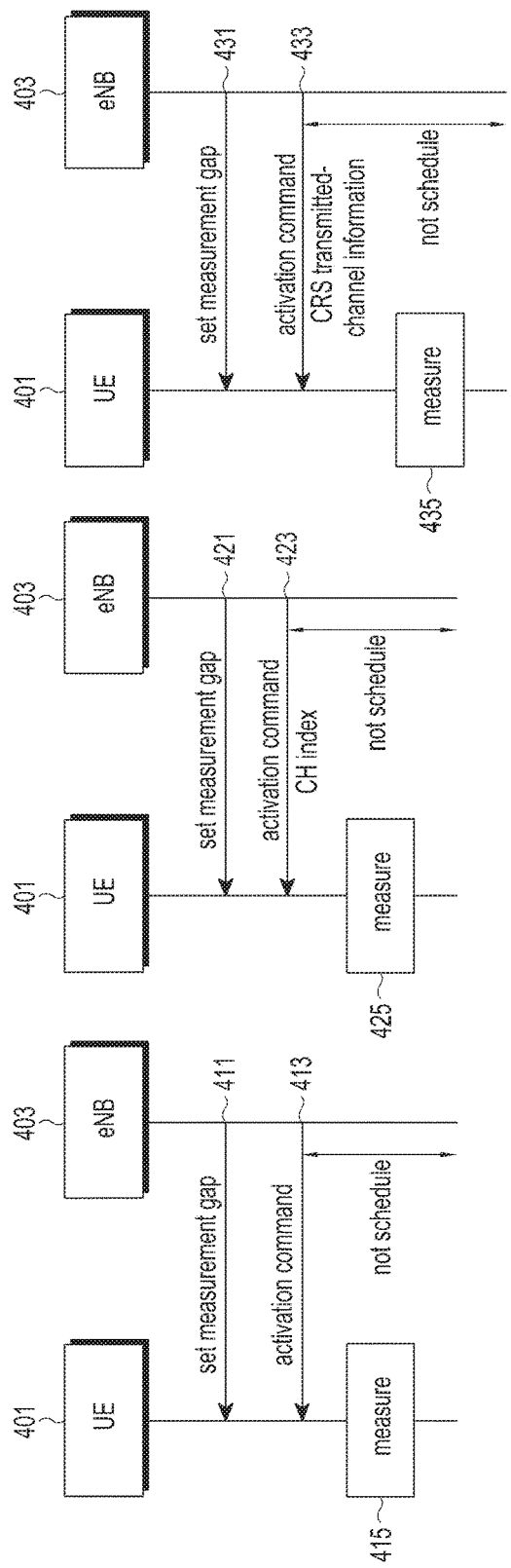
FIG. 4A, FIG. 4B and FIG. 4C are views illustrating operations in which a base station transmits an activation command and the UE performs a measurement operation according to an embodiment of the present disclosure.

FIG. 4A, FIG. 4B and FIG. 4C are views illustrating operations in which a base station transmits an activation command and the UE performs a measurement operation according to an embodiment of the present disclosure.

In FIG. 4A, the base station 403 sets a plurality of measurement gaps and transmits measurement gap configuration information as information on the set measurement gaps to the UE 401 (411). Subsequently, when a predetermined condition described below is satisfied, the base station 403 transmits an "activation command" to the UE 401 in order to instruct that at least one measurement gap be activated among the plurality of measurement gaps (413). The UE performs a measurement operation in a measurement gap indicated by the activation command (415).

FIG. 4B, which is mostly similar to (a), illustrates the additional transmission of "UE measured-channel information" indicating a channel to be measured by the UE along with an activation command in operation 423. As described above, the "UE measured-channel information" may be center frequency information on the channel or index information on the channel.

FIG. 4C, which is mostly similar to (a), illustrates the additional transmission of "CRS transmitted-channel information" indicating a channel currently used for the base station to transmit a CRS along with an activation command in operation 433. As described above, the "CRS transmitted-channel information" may be center frequency information on the channel used to transmit the CRS or index information on the channel. Further, the "CRS transmitted-channel information" may be bitmap-format information indicating with 1-bit information whether the CRS is transmitted through each channel in an unlicensed band.

Hereinafter, conditions for the base station to transmit the activation command are described.

In the present disclosure, the base station transmits the activation command to the UE when at least one of the following conditions is satisfied. Thus, the activation command may be transmitted when only one predetermined condition among the following conditions is satisfied; the activation command may be transmitted only when two predetermined conditions among three conditions are satisfied; or activation command may be transmitted only when all of the following three conditions are satisfied.

(1) Condition 1: A serving channel is currently in the busy state.

(2) Condition 2: The number of channels currently used to transmit the CRS is N or greater (N=0, 1, 2, 3, . . . ).

(3) Condition 3: A predetermined time (=T) has passed since the UE performed the last inter-frequency measurement.

Condition 1 is set for the following reason: downlink data transmission is more important than inter-frequency measurement. When the serving channel is not in the busy state, the base station may transmit downlink data to the UE. Here, when the UE performs inter-frequency measurement, the UE misses an opportunity to receive downlink data. Thus, when condition 1 is satisfied, that is, the serving channel is currently in the busy state, it is efficient to perform inter-frequency measurement.

Condition 2 is set for the following reason. The base station knows a channel currently used to transmit the CRS, whereas the UE cannot know the channel currently used to transmit the CRS until tuning a radio frequency to a frequency of the channel. When the UE tunes the radio frequency but no CRS is transmitted through the channel, the UE cannot measure signal quality and wastes power due to radio frequency tuning. To avoid such inefficiency, when the number of channels currently used to transmit the CRS is N or greater as in condition 2, the base station transmits the activation command to the UE to activate a measurement gap. Here, N is 0 or an integer greater than 0.

Condition 3 is set for the following reason. When condition 1 or condition 2 is applied in order to activate a measurement gap for inter-frequency measurement at an appropriate time, the UE may receive no activation command for a long time and thus may not perform the measurement operation for a long time. To prevent the UE from not performing the measurement operation for a long time, when a predetermined time (T) has passed since the UE performed the last measurement operation, the base station transmits an activation command regardless of condition 1 or condition 2 so that the UE may perform inter-frequency measurement.

When the base station transmits the activation command to the UE according to the foregoing conditions, the UE may obtain information on an activated measurement gap through the received activation command and thus performs inter-frequency measurement during the activated measurement gap based on the activation command.

Hereinafter, a measurement method based on "proximity" as the second measurement method according to the present disclosure is described. Here, "proximity" is used to indicate that a UE is allowed to start inter-frequency measurement when the UE approaches a base station.

Figure 5:
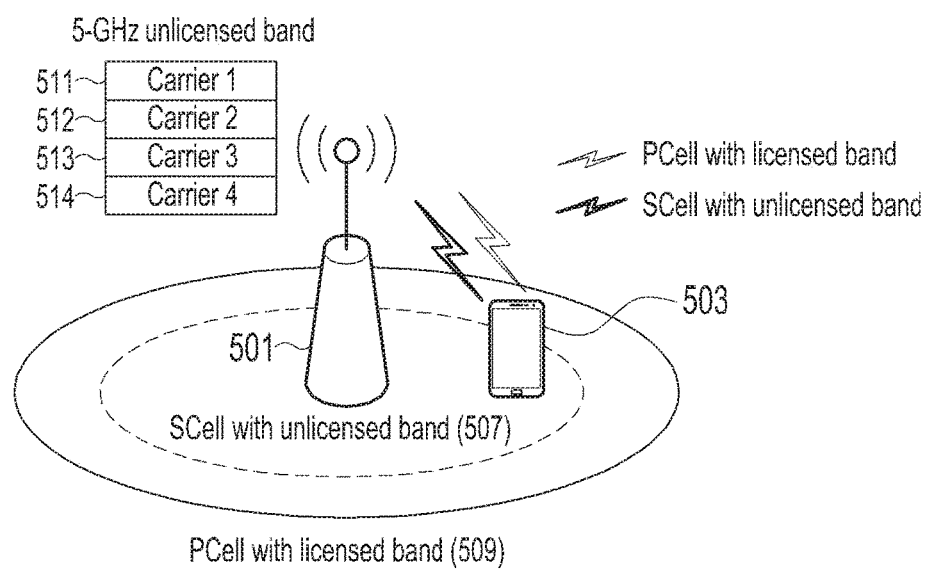
FIG. 5 is a view illustrating a proximity-based measurement method according to an embodiment of the present disclosure.

FIG. 5 is a view illustrating a proximity-based measurement method according to an embodiment of the present disclosure.

In FIG. 5, it is assumed that one base station 501 operates channels belonging to a licensed band and an unlicensed band, in which the unlicensed band includes four carriers 511, 512, 513, and 514. Path loss experienced by a UE 503 in a P (Primary) cell 509 operating with the licensed band and path loss experienced by the UE 503 in an S (Secondary) cell 507 operating with the unlicensed band are determined based on the distance the UE 503 and the base station 501 that are "common" to the P cell 509 and the S cell 507

Meanwhile, the UE 503 exchanges information for the addition of the S cell 507 with the base station 501 through the P cell 509 before adding the S cell 507 belonging to the unlicensed band. That is, the P cell 509 is already in use by the UE 503. Considering this aspect, the UE 503 may be allowed to perform inter-frequency measurement on the S cell 507 when the signal strength of the P cell 509 satisfies a specific condition. Accordingly, the UE 503 may minimize power consumed for inter-frequency measurement.

An example of a proximity-based measurement method is illustrated as follows.

In LTE-U, a P cell generally uses a licensed band of a 2-GHz band, and an S cell generally uses an unlicensed band of a 5-GHz band. Generally, with a higher center frequency, a radio signal has greater propagation loss. Further, the transmission power of a base station allowed for the licensed band is greater than the transmission power of the base station allowed for the unlicensed band. Thus, the coverage of the S cell is generally smaller than the coverage of the P cell. Considering this, a UE identifies the received signal strength of the P cell before performing inter-frequency measurement on the S cell, and then performs inter-frequency measurement on the S cell only when the received signal strength of the P cell is a certain value or higher.

Figure 6:
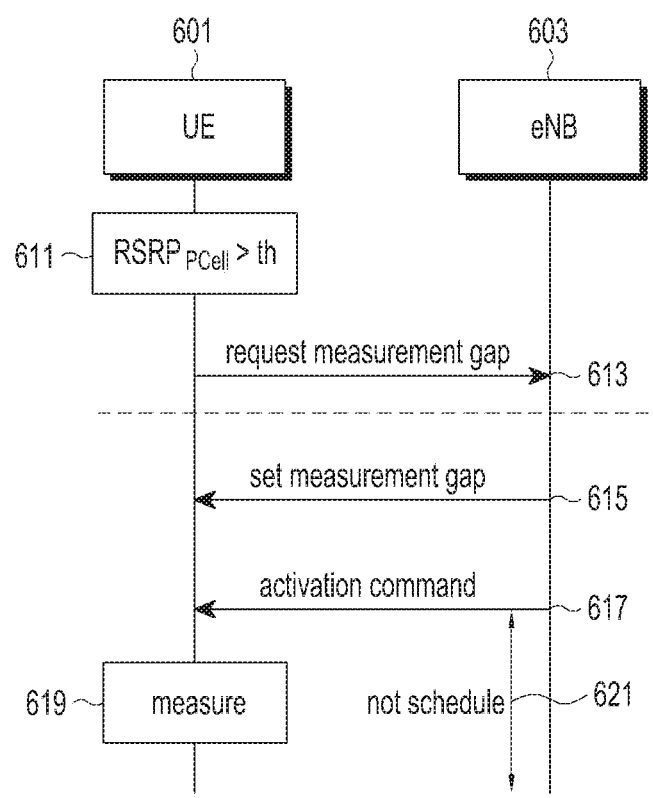
FIG. 6 is a view illustrating an example of a proximity-based measurement method according to an embodiment of the present disclosure.

FIG. 6 is a view illustrating an example of a proximity-based measurement method according to an embodiment of the present disclosure.

Referring to FIG. 6, a UE 601 determines whether the received signal strength ($RSRP_{Pcell}$) of a P cell is a predetermined threshold (th) or higher in operation 611. When the received signal strength of the P cell is the predetermined threshold or higher, the UE 601 transmits a measurement gap request message to a base station 603 through an uplink of the P cell in operation 613. In operation 615 to operation 621, the base station 603 performs an activation command-based measurement operation that is described above. Operation 615 to operation 621 are the same as operation 411 to operation 415 described in FIG. 4A, and thus a description thereof is omitted herein.

In another embodiment of a proximity-based measurement method, the base station may receive a feedback from the UE and may build a database of mapping information on the signal strength of the P cell and the signal strength of the S cell. Specifically, the base station may record the signal strength value (X) of the P cell and the signal strength value (Y) of the S cell at a specific time by each UE using feedback signals received from UEs to build a database. The base station may determine, based on the database, the signal strength of the P cell at which the signal strength of the S cell is an available level or higher. The base station notifies the UE of information on a determination result, and the UE requests a measurement gap from the base station to perform inter-frequency measurement on the S cell when the signal strength of the P cell is a value notified by the base station or higher.

Hereinafter, the uplink signal-based measurement method as the third measurement method according to the present disclosure is described.

In the first measurement method or the second measurement method, a UE basically measures a channel gain through a CRS as a downlink signal transmitted from a base station to the UE. Unlike the first measurement method or the second measurement method, the third measurement method suggested in the present disclosure is a method in which the UE transmits an uplink signal for channel measurement and the base station measures a channel in an unlicensed band using the uplink signal.

In channel measurement in an LTE-U system, it is necessarily considered that the base station detects that the channel is in the busy state. As described above, when the base station detects that the channel is in the busy state, the base station is not allowed to transmit a CRS through a downlink of the channel in the busy state. The base station having detected that the channel is in the busy state means, for example, that a Wi-Fi device, another LTE-U base station, or another UE is performing transmission in the channel. Here, when it is detected that the channel is in the busy state, the base station operates in a sensing mode or receiving mode (hereinafter, collectively referred to as a "sensing mode"). In the sensing mode, the base station is not allowed to transmit a downlink signal, but may identify an interference level in the currently used channel and may receive a signal transmitted by the UE.

When the strength of an interference signal received in the channel by the base station operating in the sensing mode is extremely higher than a CCA threshold, the base station may not successfully receive any signal. However, when the strength of the interference signal received by the base station is higher than the CCA threshold but is less than a certain reference value, the base station may be likely to successfully receive an uplink signal transmitted by the UE. Here, when the UE transmits an uplink signal for channel measurement to the base station, the base station may receive the uplink signal for channel measurement and may measure the channel.

Hereinafter, the uplink signal-based measurement method is described in detail.

According to the basic concept of the uplink signal-based measurement method, a subframe that satisfies a specific condition among subframes stipulated in the existing LTE system is set as an uplink subframe. That is, a subframe that satisfies a specific condition is set as an uplink subframe of the LTE-U system regardless of whether the subframe is stipulated as uplink/downlink in the TDD mode of the LTE system, in which an uplink/downlink subframe is dynamically set. A detailed description is made below.

When the value of an interference signal measured by the base station in the channel satisfies (CCA threshold<interference signal<V-UL threshold), the channel is in the "busy" state but is not in a state of very high interference. In this case, the UE, which detects that the channel is in the idle state, transmits an uplink signal for channel measurement through a predetermined time/frequency resource. Here, the uplink signal for channel measurement transmitted by the UE may be a Random Access preamble, a Sounding Reference Signal (SRS), or the like. This operation is possible because the channel in the unlicensed band is basically operated in the TDD mode, and thus a downlink channel and an uplink channel have almost the same properties. That is, when the channels have similar properties, a channel gain measured by the UE using a downlink signal has a similar value to that of a channel gain measured by the base station using an uplink signal. Therefore, when a CRS cannot be transmitted and received through a downlink in the channel, the UE may transmit an uplink signal through the channel, and the base station may receive the uplink signal and may perform channel measurement using the uplink signal.

In the present disclosure, a subframe in which the strength of the interference signal in the channel satisfies (CCA threshold<interference signal strength<V-UL threshold) is referred to as a "Virtual Uplink (V-UL) subframe." "Virtual" is used to indicate that the subframe is used as an uplink subframe according to (CCA threshold<interference signal strength<V-UL threshold) in the present disclosure, regardless of an initial definition of the subframe in LTE.

That is, the "virtual uplink subframe" may be an uplink subframe or may be a downlink subframe in the LTE standard. In the present disclosure, however, since the subframe satisfies (CCA threshold<interference signal strength<V-UL threshold) regardless of whether the subframe is an uplink or downlink subframe, the subframe is set as a "virtual uplink subframe," which is used for uplink transmission and reception.

Figure 7:
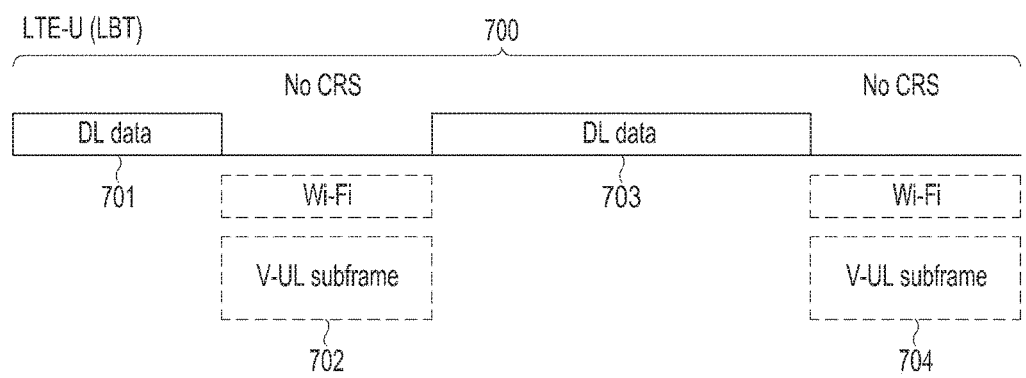
FIG. 7 is a view illustrating an example of a virtual uplink subframe according to an embodiment of the present disclosure.

FIG. 7 is a view illustrating an example of a virtual uplink subframe according to an embodiment of the present disclosure.

Referring to FIG. 7, it is assumed that all four subframes 701, 702, 703, and 704 shown in FIG. 7 are set as downlink frames in an LTE UL/DL configuration (700). However, since subframes 702 and 704 are occupied by a Wi-Fi device, a base station may not transmit a CRS. Here, as described above, the subframes 702 and 704, which are originally set for a downlink, are set and used as virtual uplink subframes.

Figure 8:
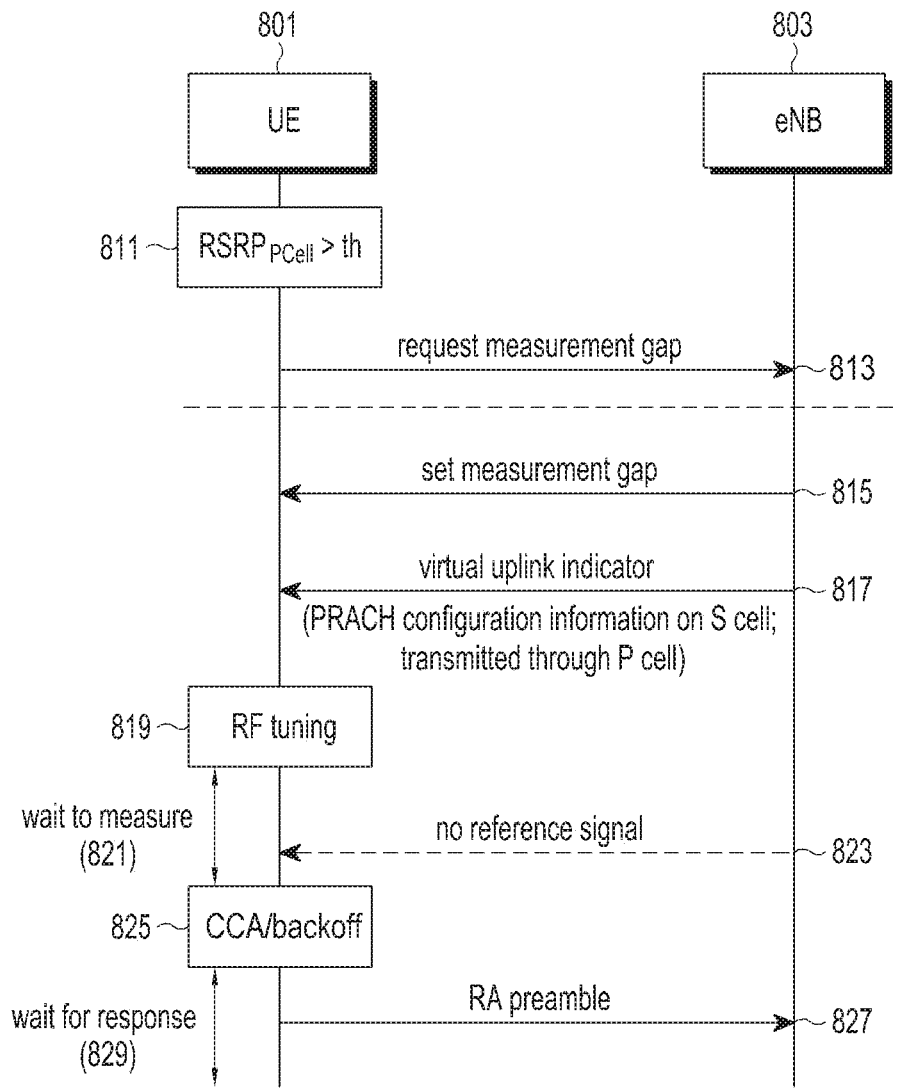
FIG. 8 is a view illustrating an example in which a virtual uplink subframe is applied to a proximity-based channel measurement method according to an embodiment of the present disclosure.

FIG. 8 is a view illustrating an example in which a virtual uplink subframe is applied to a proximity-based channel measurement method according to an embodiment of the present disclosure.

Specifically, when the signal strength ($RSRP_{Pcell}$) of a P cell is a threshold (th) or higher in operation 811, a UE 801 requests a measurement gap from a base station 803 in operation 813. Accordingly, the base station 803 sets a measurement gap for the UE 801 and transmits measurement gap configuration information to the UE 801 in operation 815.

Meanwhile, when the base station 803 determines that a corresponding channel is not occupied in the set measurement gap, the base station 803 is allowed to transmit a CRS via a downlink of the channel, and thus the UE has no problem measuring a channel gain using the CRS. However, when the base station 803 detects that the channel is occupied in the set measurement gap, the base station 803 identifies whether a corresponding subframe satisfies a condition for being used as a virtual uplink, that is, (CCA threshold<interference signal strength<V-UL threshold). When the virtual uplink condition is satisfied, the base station 803 transmits a virtual uplink indicator through the P cell. Operation 817 illustrates the transmission of the virtual uplink indicator. The virtual uplink indicator includes Physical Random Access Channel (PRACH) configuration information on a virtual uplink subframe of an S cell. Meanwhile, when the UE 801 receives the virtual uplink indicator, the UE 801 tunes a radio frequency in operation 819, waits for measurement for a predetermined time (821), and performs CCA in operation 825. Reference number 823 indicates that no reference signal is received from the base station 803 at this time. When a result of performing CCA shows that an interference signal in the channel satisfies (interference signal<CCA threshold) to determine that the channel is idle, the UE transmits an uplink signal for channel measurement through a predetermined time/frequency resource in operation 827. As described above, the uplink resource for channel measurement may be an RA preamble or an SRS. Subsequently, the UE 801 waits for a response to the transmission of the uplink signal (829). Meanwhile, when the base station 803 receives the uplink resource for channel measurement, the base station 803 may measure a gain of a channel between the base station and the UE and may determine whether to add/release the S cell according to a measurement result.

For reference, to employ such a method, the P cell operating in a licensed band and the S cell operating in an unlicensed band need to be synchronized, which is currently considered in LTE Carrier Aggregation (CA). Therefore, the P cell and the S cell may be synchronized by applying an LTE CA synchronization method. Here, a synchronizing method may be a different method, without being limited to the LTE CA synchronization method.

Meanwhile, when the P cell and the S cell are synchronized, the UE may infer a subframe boundary of the S cell through the P cell. When the UE receives a virtual uplink indicator from the base station, the UE transmits an uplink signal for channel measurement (RA preamble or SRS) to the base station through a pre-assigned time/frequency resource. When an RA preamble is used as the uplink signal, the UE transmits the RA preamble using a time/frequency resource stipulated in a PRACH configuration for a virtual uplink; when an SRS is used as the uplink signal, the UE transmits the SRS using a time/frequency resource stipulated in an SRS configuration for a virtual uplink, which will be described below. Here, when determining the PRACH and SRS configurations for the virtual uplink, a region illustrated in FIG. 9A and FIG. 9B are excluded from a subframe.

Figure 9A:
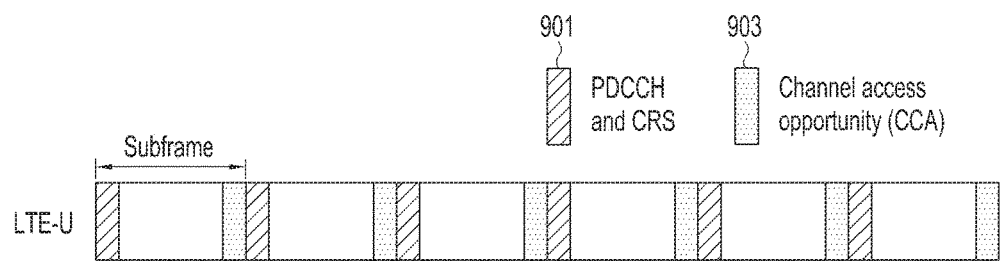
FIG. 9A and FIG. 9B are views illustrating a region excluded from a subframe when determining PRACH and SRS configurations for a virtual uplink in a virtual uplink method according to an embodiment of the present disclosure.
Figure 9B:
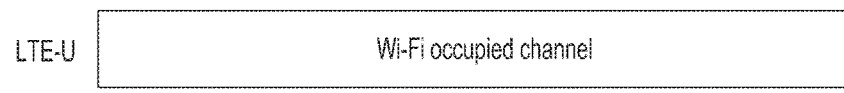

FIG. 9A and FIG. 9B are views illustrating a region excluded from a subframe when determining PRACH and SRS configurations for a virtual uplink in a virtual uplink method according to an embodiment of the present disclosure.

FIG. 9A illustrates LTE-U subframes, which are six subframes, and FIG. 9B illustrates that a Wi-Fi device occupies a channel. Here, in configuring a PRACH and an SRS for the virtual uplink, a Physical Downlink Control Channel (PDCCH) region and/or a CRS region 901 and a CCA region 903 are excluded from each subframe. First two or three symbols are generally excluded from the PDCCH region 901. Meanwhile, it is optional to exclude the CRS region 903.

<Method for Using Uplink Transmission and Reception Resource>

Hereinafter, a description on the efficient use of a resource through uplink transmission and reception in an LTE-U system is made.

The present disclosure extends the concept of a virtual uplink described above to suggest a method for transmitting uplink data through a virtual uplink. That is, a virtual uplink has been defined above, and an operation in which a UE transmits an uplink signal for channel measurement, for example, an RA preamble or SRS, to a base station through the virtual uplink has been described. Hereinafter, an operation of transmitting uplink data, in addition to channel measurement, through a virtual uplink is illustrated.

Figure 10:
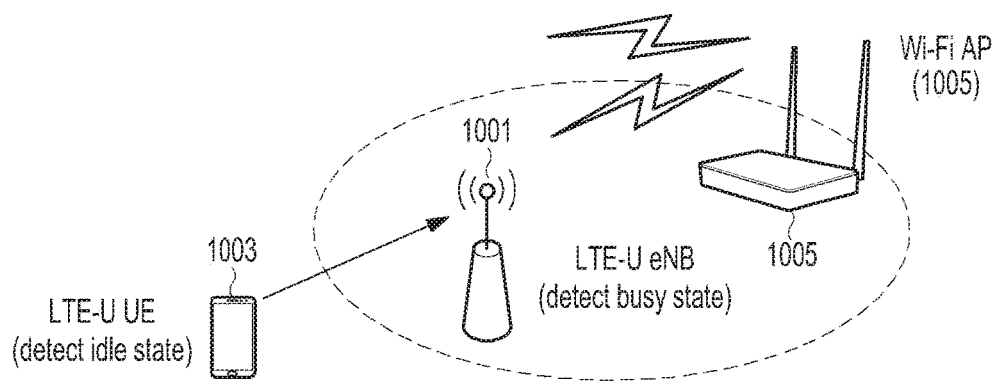
FIG. 10 is a view illustrating an example of the concept of transmitting and receiving uplink data through a virtual uplink according to an embodiment of the present disclosure.

FIG. 10 is a view illustrating an example of the concept of transmitting and receiving uplink data through a virtual uplink according to an embodiment of the present disclosure.

FIG. 10 illustrates a base station 1001, a UE 1003, and a Wi-Fi device 1005 in an LTE-U system.

When the strength of an interference signal measured by the base station 1001 with respect to a channel in an unlicensed band currently occupied by the Wi-Fi device 1005 corresponds to (CCA threshold<interference signal strength<virtual uplink threshold), a corresponding subframe is set as a virtual uplink subframe. Further, in the present disclosure, the UE 1003 transmits uplink data to the base station 1001 through the virtual uplink to efficiently use a frequency resource.

For reference, uplink/downlink configurations currently defined in LTE TDD modes are illustrated in Table 1.

For the convenience of description, subframe configurations in Table 1 may be referred to as "normal-mode subframe configurations."

TABLE 1

| TDD | DL/UL switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| FDD (DL) | | D | D | D | D | D | D | D | D | D | D |
| FDD (UL) | | U | U | U | U | U | U | U | U | U | U |

Referring to Table 1, the numbers of downlink subframes and uplink subframes in a frame are different according to a TDD configuration based on a normal-mode subframe configuration. For example, in TDD configuration 3, subframes 0, 5, 6, 7, 8, and 9 are allocated for a downlink, subframes 2, 3, and 4 are allocated for an uplink, and subframe 1 is a special subframe for switching between downlink/uplink subframes.

In the foregoing normal-mode subframe configurations, when a base station using, for example, TDD configuration 3, detects that a channel is occupied during ten subframes from subframe 5 of a specific frame, the base station is not allowed to perform downlink transmission in at least the ten downlink subframes according to the CCA regulations. This is because a TDD configuration is static in the current LTE, which results in the waste of at least downlink resources in such a system.

As described above, in a system where an uplink/downlink subframe is determined to be static, when the base station detects that a channel is occupied, the base station is not allowed to use a (predetermined) downlink subframe. However, a situation in an uplink is different from that in a downlink.

Since one cell includes one base station and a plurality of UEs, only one transmitter (that is, base station) is present in a downlink in the cell. However, since a plurality of transmitters (that is, UEs) is present in an uplink and all UEs are distributed at different positions, although some of the UEs may detect that a channel is occupied and thus may not transmit uplink data, some of the remaining UEs may detect that the channel is in the idle state and may transmit uplink data.

Thus, it is preferable in view of efficiency in resource use that a UE detecting that a channel is in the idle state performs uplink transmission when a subframe satisfies a virtual uplink condition, that is, (CCA threshold<interference strength<virtual uplink threshold), regardless of the normal-mode subframe configurations listed in Table 1. The transmission and reception of uplink data via a virtual uplink may improve uplink performance for a UE and may increase efficiency in using all resources for a base station and an entire system.

Further, when the traffic of uplink data transmitted and received via a virtual uplink is great, a TDD configuration which includes a relatively small number of uplink subframes and a relatively large number of downlink frames may be selected and used, among the TDD configurations in Table 1, in an operation according to a normal-mode subframe configuration in Table 1 after a virtual uplink interval is ended. An operation of selecting and using a TDD configuration in a normal operation after the end of a virtual uplink interval will be described with reference to FIG. 12.

That is, after the end of a virtual uplink interval, a base station and a UE may select one configuration among the normal-mode subframe configurations according to each predetermined criterion and may operate.

Figure 11:
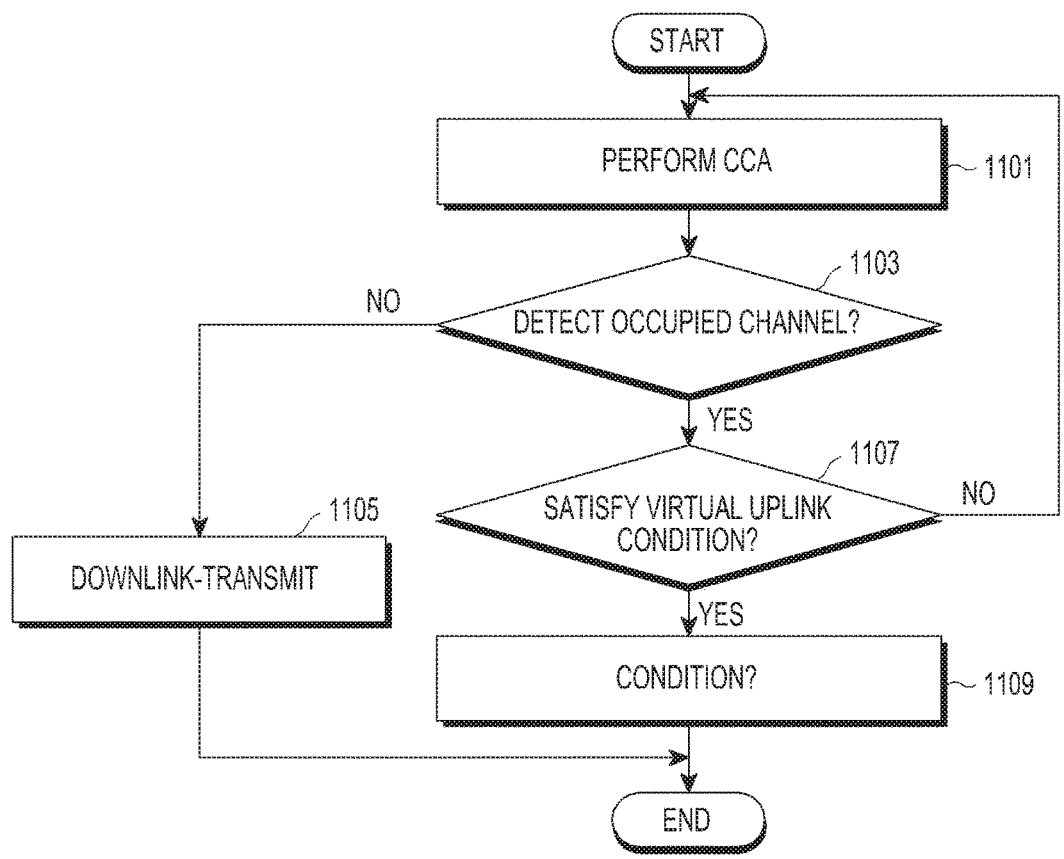
FIG. 11 is a view illustrating an operation of a base station in which the base station applies a virtual uplink according to an embodiment of the present disclosure.

FIG. 11 is a view illustrating an operation of a base station in which the base station applies a virtual uplink according to an embodiment of the present disclosure.

In operation 1101, the base station performs CCA at a predetermined time. The predetermined time may be (i) a frame boundary, (ii) a subframe boundary, (iii) an n-th symbol, or (iv) a random time. As a result of performing CCA, when no occupied channel is detected in operation 1103, the base station transmits downlink data in an unlicensed channel in operation 1105. When an occupied channel is detected, the base station determines whether the channel in the busy state satisfies a virtual uplink condition in operation 1107. That is, the base station determines whether the channel satisfies (CCA threshold<interference signal strength<virtual uplink threshold). When the channel does not satisfy the virtual uplink condition, the base station goes back to operation 1101. When the channel satisfies the virtual uplink condition, the base station applies a virtual uplink in operation 1109 so that a UE capable of performing uplink transmission through the virtual uplink performs uplink transmission.

Table 2 below illustrates uplink physical channels and uplink physical signals that are present in a virtual uplink.

Referring to Table 2, in a virtual uplink, a Physical Uplink Shared Channel (PUSCH) for transmitting data and a Physical Random Access Channel (PRACH) for transmitting a random access preamble are supported. However, a Physical Uplink Control Channel (PUCCH) for transmitting an uplink control message is generally transmitted through a licensed band. Therefore, a PUCCH may not supported in a virtual uplink. Further, a Demodulation Reference Signal (DRS) for demodulating data and a Sound Reference Signal (SRS) for measuring a channel between a base station and a UE are all supported in a virtual uplink.

TABLE 2

| | Channel/signal | Description | Virtual uplink |
|---|---|---|---|
| Uplink physical channel | Physical Uplink Shared Channel (PUSCH) | To carry uplink-SCH | ○ |
| | Physical Uplink Control Channel (PUCCH) | To carry HARQ ACK/NACK To carry scheduling request To carry CQI/PMI/RI | X (P cell used) |
| | Physical Random Access Channel (PRACH) | To carry random access preamble Used for synchronization | ○ |
| Uplink physical signal | Demodulation Reference Signal (DRS) | Used for synchronization detection Used for channel measurement | ○ |
| | Sound Reference Signal (SRS) | Used for channel measurement | ○ |

Figure 12:
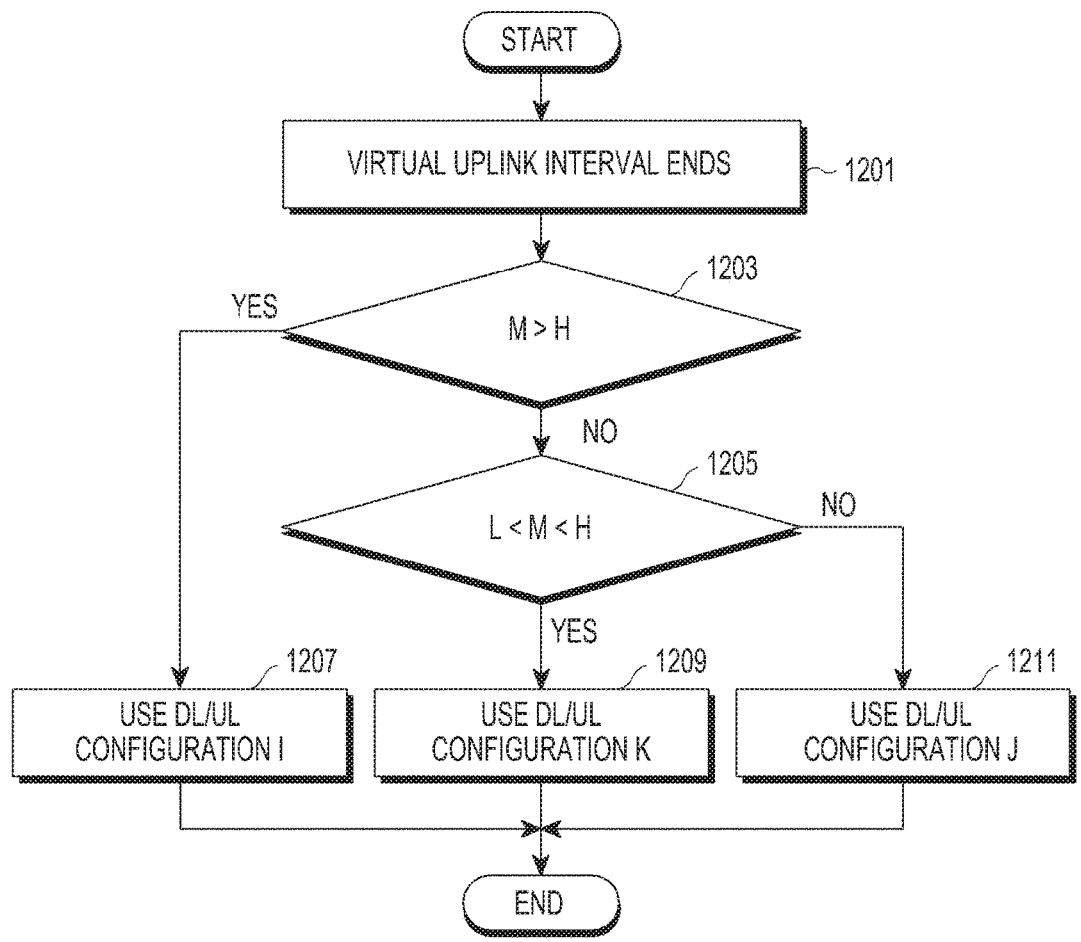
FIG. 12 is a view illustrating an operation of selecting a TDD configuration in a normal operation after the end of a virtual uplink interval according to an embodiment of the present disclosure.

FIG. 12 is a view illustrating an operation of selecting a TDD configuration in a normal operation after the end of a virtual uplink interval according to an embodiment of the present disclosure.

The selection of a TDD configuration after the end of a virtual uplink interval in FIG. 12 may be performed by a base station or a UE according to a selecting condition.

In operation 1201, a time interval in which a virtual uplink is applied, as illustrated in operation 1109 of FIG. 11, is ended. When the number of actual uplink subframes, M, is greater than H as a predetermined upper threshold in the virtual uplink interval in operation 1203, an i-th configuration among the normal-mode subframe configurations in Table 1 is used in operation 1207. Meanwhile, when M is not greater than H, operation 1205 is performed.

When M is greater than L as a predetermined lower threshold (that is, L<M<H) in operation 1205, a j-th configuration among the normal-mode subframe configurations in Table 1 is used in operation 1209. However, when M is not greater than L (that is, L>M), a k-th configuration among the normal-mode subframe configurations in Table 1 is used in operation 1211.

As illustrated in FIG. 12, in a normal operation interval after the end of the virtual uplink interval, a TDD configuration that includes a relatively small number of uplink subframes and a relatively large number of downlink frames may be selected and used among the TDD configurations.

Figure 13:
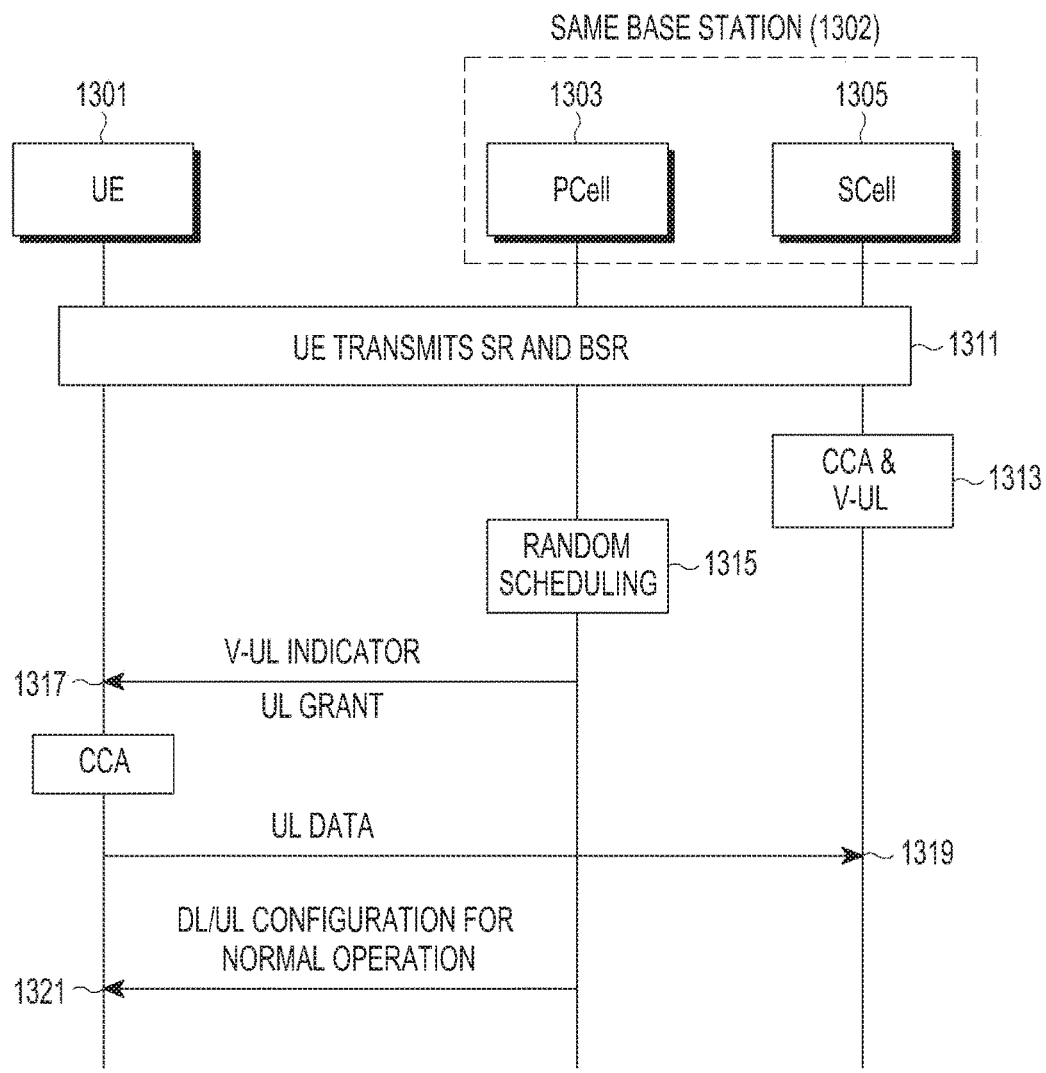
FIG. 13 is a view illustrating a process of transmitting and receiving data through a virtual uplink according to a random scheduling scheme according to an embodiment of the present disclosure.

FIG. 13 is a view illustrating a process of transmitting and receiving data through a virtual uplink according to a random scheduling scheme according to an embodiment of the present disclosure.

For reference, FIG. 13 illustrates that one base station 1302 operates both a P cell 1303 and an S cell 1305.

In operation 1311, a UE 1301 having uplink data to transmit transmits a Scheduling Request (SR) and a Buffer Status Report (BSR) to the base station 1302 through the P cell 1303.

In operation 1313, the base station 1302 performs a CCA operation on the S cell 1305 and applies a virtual uplink in a specific interval according to the foregoing description.

In operation 1315, the base station 1302 schedules a UE to perform uplink transmission. As a method for the base station to schedule a UE to perform virtual uplink transmission in the present disclosure, (i) random scheduling as a method of determining a random UE and (ii) scheduling based on a feedback signal from a UE may be used. In operation 1315 of FIG. 13, random scheduling is used. When a UE to perform uplink transmission is determined according to random scheduling in operation 1315, the base station transmits a virtual uplink (V-UL) indicator, along with an uplink grant as resource allocation information, to the UE through the P cell 1303 in operation 1317.

The virtual uplink indicator functions to notify the UE that a virtual uplink subframe starts.

When the virtual uplink indicator is received, the UE sets a subframe in which the virtual uplink indicator is received as virtual uplink subframe 0. Further, the UE stops a PRACH configuration and an SRS configuration, which are used in a normal operation, and applies a PRACH configuration and an SRS configuration for a virtual uplink to operate.

In operation 1317, the UE 1301 performs CCA in the virtual uplink subframe based on information of the virtual uplink indicator. As a result of CCA, when the channel is in the idle state, the UE 1301 transmits UL data through the S cell 1305 in operation 1319. When uplink transmission in the virtual uplink interval is ended, the base station configures a DL/UL for a normal operation in operation 1321 and transmits information on the DL/UL configuration through the P cell 1303.

Figure 14:
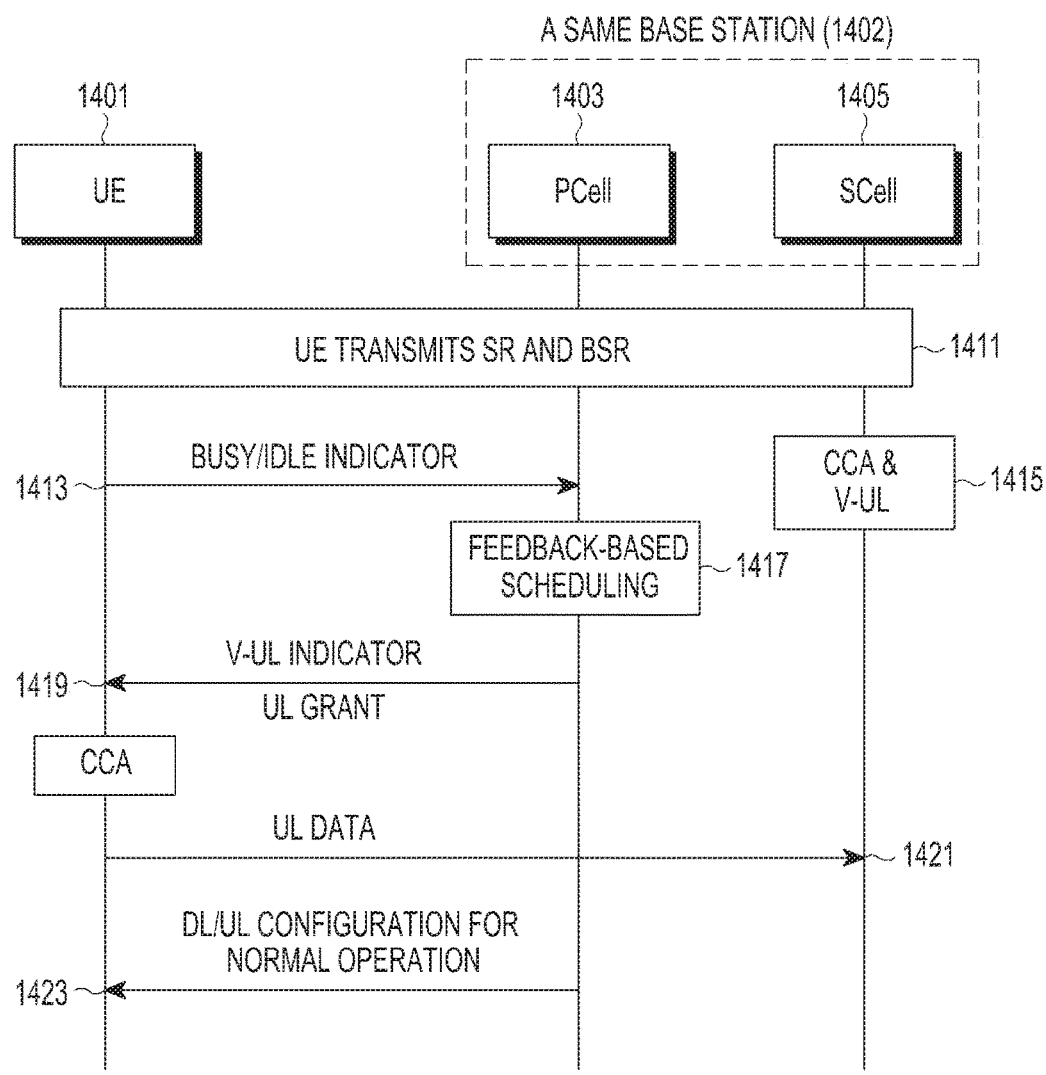
FIG. 14 is a view illustrating a process of transmitting and receiving data through a virtual uplink according to a scheduling method based on a feedback signal according to an embodiment of the present disclosure.

FIG. 14 is a view illustrating a process of transmitting and receiving data through a virtual uplink according to a scheduling method based on a feedback signal according to an embodiment of the present disclosure.

FIG. 14 illustrates a scheduling method based on a feedback method as a second scheduling method mentioned in FIG. 13. Since the process in FIG. 14 is mostly the same as FIG. 13, only differences are mentioned herein. FIG. 14 is different from FIG. 13 in that a UE 1401 transmits a feedback signal through a P cell 1403 of a base station in operation 1413 and the base station 1402 schedules a UE to transmit data through a virtual uplink using the feedback signal in operation 1417. Meanwhile, the feedback signal is information resulting from the last CCA performed by the UE and includes information on whether a channel is occupied or idle.

However, in both cases of the scheduling methods in FIG. 13 and FIG. 14, the base stations may not accurately recognize a UE in the idle state with respect to the channel in the virtual uplink interval. This is because no information is received from a UE in random scheduling of FIG. 13. In the feedback-based scheduling method of FIG. 14, the feedback signal received by the base station from the UE is not current real-time information but a result of CCA previously performed by the UE. However, whether a UE is in the busy/idle state with respect to the channel at the present time is associated with whether the busy/idle state by a CCA result previously performed by the UE. Thus, the feedback-based virtual uplink scheduling method illustrated in FIG. 14 exhibits greater scheduling performance than the random scheduling method in FIG. 13. Here, although random scheduling is performed without a feedback signal from a UE as in FIG. 13, the number of wasted subframes may be reduced as compared with the conventional LTE system, in which no virtual uplink is used.

<Channel Measurement Method Using CSI-RS in Unlicensed Band>

Hereinafter, an operation in which a base station transmits a Channel State Information Reference Signal (CSI-RS) to a UE through a channel in an unlicensed band and the UE measures the signal strength of the CSI-RS and feeds back Channel Quality information (CQI) to the BS according to a measurement result.

For understanding, a CSI-RS is briefly described in comparison with a CRS.

As described above, a CRS is basically used for channel measurement by a UE. Here, a CSI-RS may be additionally used for channel measurement. The CRS supports channel measurement for 4-layer spatial multiplexing, while the CSI-RS supports even channel measurement for 8-layer spatial multiplexing. The CSI-RS and the CRS are transmitted through different antenna ports. Further, the CRS maintains orthogonality in time/frequency domains, and the CSI-RS may maintain orthogonality in time/frequency domains plus a code domain, that is, in time/frequency/code domains. The CSI-RS is transmitted to be specific to each UE and is not subjected to precoding. CSI-RS configuration information is transmitted to each UE through RRC signaling and may include the following pieces of information.

$N_t$: Number of CSI-RS antenna ports
$N_i$: CSI-RS pattern index
$N_p$: Duty cycle or periodicity of CSI-RS transmission
$N_{offset}$: Subframe offset
a: PDSCH transmission power assumed by UE when UE feeds back CSI Examples of the pieces of information included in the CSI-RS configuration information are listed in Table 3 and Table 4.

TABLE 3

| Parameter | Value |
|---|---|
| Number of CSI-RS antenna ports | 2, 4, 8 |
| Intra-subframe location index | 32/16/8 patterns for 2/4/8 CSI-RS ports |

TABLE 4

| $I_{cycle,\ subframe\ offset}$ | Duty cycle | Subframe offset |
|---|---|---|
| $I_{cycle,\ subframe\ offset} <= 4$ | 5 | $I_{cycle,\ subframe\ offset}$ |
| $5 <= I_{cycle,\ subframe\ offset} <= 14$ | 10 | $I_{cycle,\ subframe\ offset} - 5$ |
| $15 <= I_{cycle,\ subframe\ offset} <= 34$ | 20 | $I_{cycle,\ subframe\ offset} - 15$ |
| $35 <= I_{cycle,\ subframe\ offset} <= 74$ | 40 | $I_{cycle,\ subframe\ offset} - 35$ |
| $75 <= I_{cycle,\ subframe\ offset} <= 154$ | 80 | $I_{cycle,\ subframe\ offset} - 75$ |

In the current LTE system, a base station periodically transmits a CSI-RS to a UE at a predetermined time based on the CSI-RS configuration information. In the LTE-U system, however, in view of frequency properties, a base station may not transmit any signal including a CSI-RS when it is determined that an unlicensed-band carrier is currently in the busy state. The present disclosure suggests a channel measurement and CQI feedback operation using a CSI-RS in view of such a restriction on the LTE-U system as follows.

In a first stage, a base station transmits CSI-RS configuration information on each unlicensed-band carrier to a UE. The CSI-RS configuration information is transmitted through RRC signaling as in the existing LTE system. Here, each unlicensed-band carrier refers to an unlicensed-band carrier added to the UE or newly activated.

In a second stage, the base station periodically or aperiodically transmits, to the UE through a P cell using a licensed band, use and transmission state information indicating whether each unlicensed-band channel is used and whether a CSI-RS is transmitted through the unlicensed channel. The following methods may be used to transmit the use and transmission state information on the unlicensed-band channel.

In the most basic method, the base station may transmit use state information on each unlicensed-band carrier as 1-bit flag-form information through the P cell every subframe. For example, the base station transmits 1 to the UE in the case of the busy state and transmits 0 to the UE in the case of the idle state.

When an LTE-U device operates based on Frame Based Equipment (FBE), the base station transmits idle state information on each unlicensed-band carrier as 1-bit information through the P cell every fixed frame period defined in regulations for the use of an unlicensed band. When the 1-bit use state information is received, the UE determines that the use state information is valid during the current fixed frame period. For reference, the term "frame" used in "fixed frame period" is to be distinguished from the term "frame" used in the LTE system. That is, "fixed frame period" is a term defined in the regulations for the use of the unlicensed band. Meanwhile, "frame" in the LTE system refers to the unit of a time interval in the LTE system.

When an LTE-U device operates based on Load Based Equipment (LBE), the maximum channel occupancy time of the base station may frequently change. Thus, in this case, a method of transmitting 1-bit idle state information through the P cell every subframe may be used. According to another method available for the LBE-based operation, the base station may transmit only a 1-bit indicator indicating the busy state when detecting the busy state. Meanwhile, when the base station detects the idle state to detect that the channel is occupied, the base station transmits a 1-bit indicator indicating the idle state along with the channel occupancy time information. When the idle state is received, the UE determines that the 1-bit idle state indicator received from the base station is valid during the channel occupancy time.

In a third stage, the UE determines that only a CSI-RS, which is transmitted when the unlicensed-band carrier is in the idle state, is a valid CSI-RS based on the CSI-RS configuration information received in the first stage and the use state information on the unlicensed-band carrier received in the second stage. Thus, when at least two CSI-RS samples are filtered or averaged among successively received CSI-RSs, a filtering result may be derived considering only a CSI-RS transmitted when the unlicensed-band carrier is in the idle state, while disregarding a CSI-RS transmitted while the unlicensed-band carrier is occupied.

In a fourth stage, the UE feeds back a CSI-RS measurement result to the base station through the P cell. A feedback timing and a feedback resource may be determined in the same manner as in the existing LTE system.

The LTE-U base station may not transmit a CSI-RS when the unlicensed-band carrier is in the busy state. However, even though the base station transmits no CSI-RS, the LTE-U UE may misjudge that the base station transmits a CSI-RS due to an interference signal. To prevent a misjudgment by the UE, the base station transmits the idle state information on the unlicensed-band carrier to the UE in real time through the P cell, and the UE may clearly identify whether the base station transmits a CSI-RS using the idle state information received through the P cell.

In the second stage, it is assumed that the base station has data to transmit, is not allowed to transmit the data when a channel is in the busy state according to the LTE-U system regulations, and transmits the data when the channel is in the idle state. However, when the base station has no data to transmit, the base station does not perform data transmission even when the channel is in the idle state. Thus, three situations are considered in the present disclosure. The three situations are (1) Busy, (2) Idle-Transmit, and (3) Idle-No Transmit.

In the second stage, the base station transmits the "use and transmission state information" to the UE in order to indicate a current situation among the foregoing three situations. The use and transmission state information may be transmitted using the three methods mentioned above in the second stage. That is, (i) the use and transmission state information may be transmitted every subframe, (ii) the use and transmission state information may be transmitted every frame in the FBE-based case, and (iii) the use and transmission state information indicator may be transmitted along with channel occupancy time information in the LBE-based case.

Meanwhile, in the present disclosure, the UE may request the base station to transmit a CSI-RS.

The existing LTE base station provides CSI-RS configuration information to the UE and periodically transmits a CSI-RS according to the CSI-RS configuration information. However, in LTE-U, since periodical CSI-RS transmission is not ensured, the UE may request the base station to transmit a CSI-RS when needed.

Figure 15:
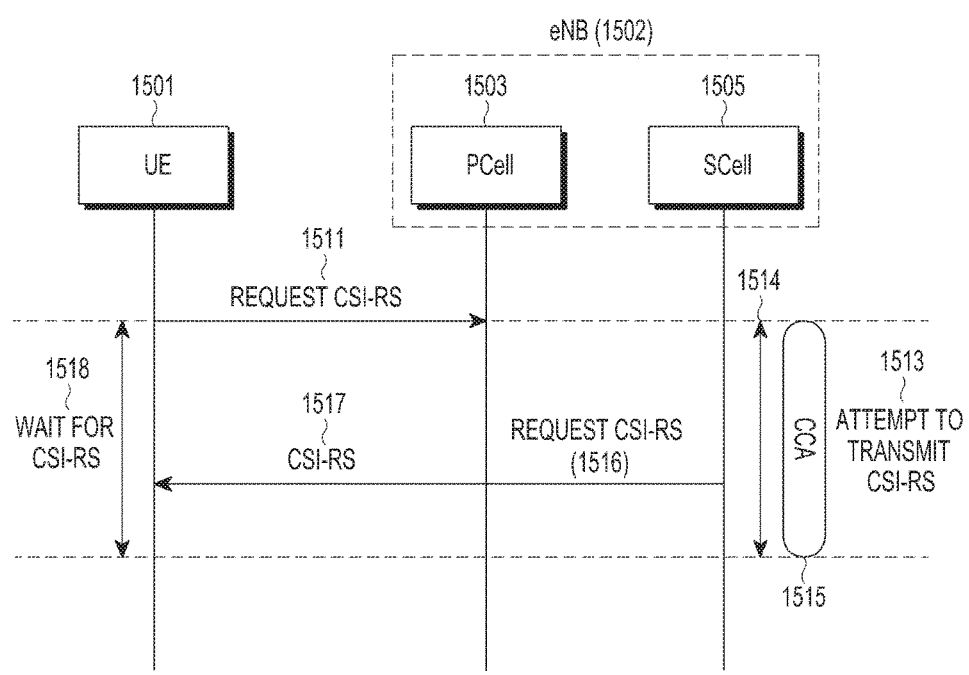
FIG. 15 is a view illustrating an example in which a UE requests a base station to transmit a CSI-RS and the base station transmits a CSI-RS upon the request according to an embodiment of the present disclosure.

FIG. 15 is a view illustrating an example in which a UE requests a base station to transmit a CSI-RS and the base station transmits a CSI-RS upon the request according to an embodiment of the present disclosure.

In operation 1511, the UE 1501 requests, through an uplink of a P cell 1503, the base station 1502 to transmit a CSI-RS via a downlink of an S cell.

When the request is received, the base station 1502 attempts to transmit a CSI-RS during a time of predetermined N subframes 1514 in operation 1513. That is, the base station 1502 performs CCA on a channel of the S cell during the interval of N subframes 1514 (1515), and when it is identified that the channel of the S cell 1505 is in the idle state (1516), the base station 1502 transmits a CSI-RS to the UE 1501 in operation 1517. For reference, since the transmission of the CSI-RS is based upon the request from the UE 1501, the base station 1502 attempts to transmit the CSI-RS at a separate time from a transmission time determined according to CSI-RS configuration information. Further, when the channel remains busy during the N subframes, the base station 1502 transmits no CSI-RS.

Meanwhile, since the CSI-RS may be transmitted from the base station 1502 after the request for the CSI-RS, the UE 1501 receives the CSI-RS transmitted from the base station in operation 1517, while waiting to receive the CSI-RS during the N subframes in operation 1518.

Figure 16:
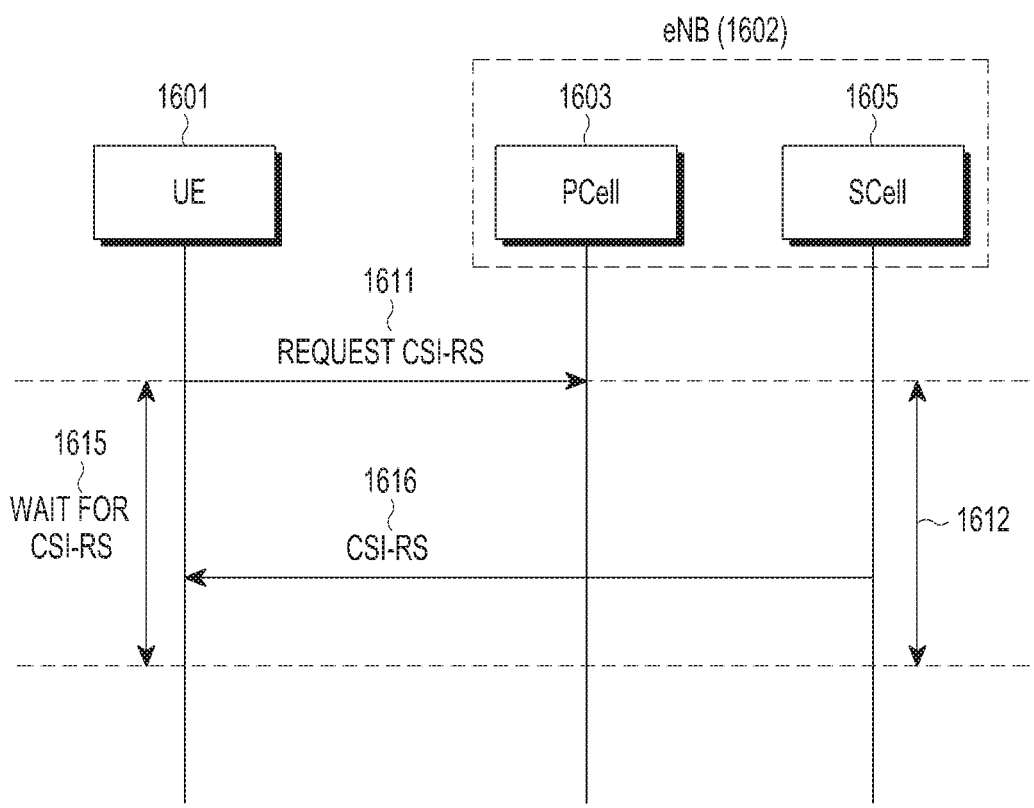
FIG. 16 is a view illustrating another example in which a UE requests a base station to transmit a CSI-RS and the base station transmits a CSI-RS upon the request according to an embodiment of the present disclosure.

FIG. 16 is a view illustrating another example in which a UE requests a base station to transmit a CSI-RS and the base station transmits a CSI-RS upon the request according to an embodiment of the present disclosure.

Unlike FIG. 15, FIG. 16 illustrates an example in which the base station immediately transmits a CSI-RS in response to a CSI-RS request from a UE without performing CCA on an S cell 1605 using an unlicensed band.

In FIG. 16, the base station may transmit the CSI-RS without CCA on the following assumption.

In regulations on the unlicensed band, "Short Control Signaling (SCS)" is separately defined. The SCS refers to a control signal essential for data transmission and reception, such as ACK/NACK signals, and includes predetermined kinds of control signals. Here, it is stipulated that a short control signal corresponding to the SCS may be transmitted without CCA on a channel in the unlicensed band. That is, a predetermined short control signal may be transmitted through the channel in the unlicensed band without examining whether the current channel state is busy. When the CSI-RS is included in the short control signal, the base station may transmit the CSI-RS without CCA on the unlicensed band. Since the CSI-RS is a control signal essential to identify a channel between the base station and the UE to add/release the S cell, the CSI-RS is assumed as a "short control signal."

FIG. 16 illustrates an example on the assumption that the CSI-RS is a short control signal, which may be transmitted without CCA.

Referring to FIG. 16, the UE 1601 requests, through an uplink of a P cell 1603, the base station 1602 to transmit a CSI-RS via a downlink of the S cell 1605. The base station 1602 attempts to transmit a CSI-RS during N subframes 1612, and the UE 1601 waits to receive the CSI-RS during the N subframes 1612 (1615). FIG. 16 illustrates that the base station 1602 transmits the CSI-RS in operation 1616.

In another example, the base station 1602 transmits a CSI-RS after predetermined M subframes elapse from a subframe in which the UE 1601 requests a CSI-RS, and the UE may operate on the assumption that the CSI-RS is received after the M subframes elapse from the subframe in which the UE requests the CSI-RS.

Figure 17:
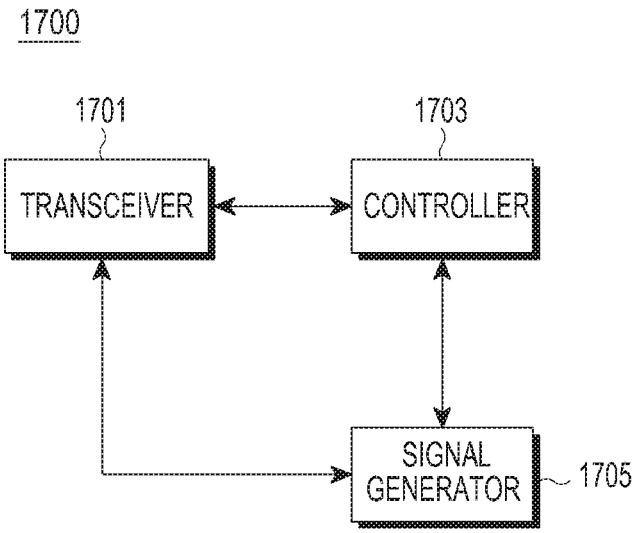
FIG. 17 is a view illustrating a base station device operating according to embodiments of the present disclosure.

FIG. 17 is a view illustrating a base station device operating according to embodiments of the present disclosure.

The base station device 1700 includes a transceiver 1701, a controller 1703, and a signal generator 1705 and performs the foregoing embodiments of the present disclosure.

The controller 1703 controls overall operations of the base station device according to the embodiments of the present disclosure, the signal generator 1705 generates a signal and a message according to the embodiments of the present disclosure, and the transceiver 1701 performs signal transmission and reception with a UE.

For example, the controller 1703 allocates at least one of a plurality of measurement gaps set for the measurement of a licensed band for the measurement of an unlicensed band, and the signal generator 1705 generates an activation command to activate the allocated measurement gap for the measurement of the unlicensed band and transmits the activation command through the transceiver 1701. Subsequently, the transceiver 1701 receives a measurement result of the unlicensed band measured by the UE in the activated measurement gap. Further, the signal generator 1705 generates measurement gap configuration information as information on the plurality of measurement gaps set for the measurement of the licensed band and transmits the measurement gap configuration information to the UE through the transceiver 1701, according to control by the controller 1703.

The components of the base station device 1700 may perform operations according to the embodiments of the present disclosure as in the foregoing examples. A person skilled in the art can readily implement the foregoing embodiments of the present disclosure from the configuration of the base station device 1700, and thus detailed descriptions on embodiments in which the foregoing embodiments are implemented in the base station device 1700 are omitted for the convenience of description.

Figure 18:
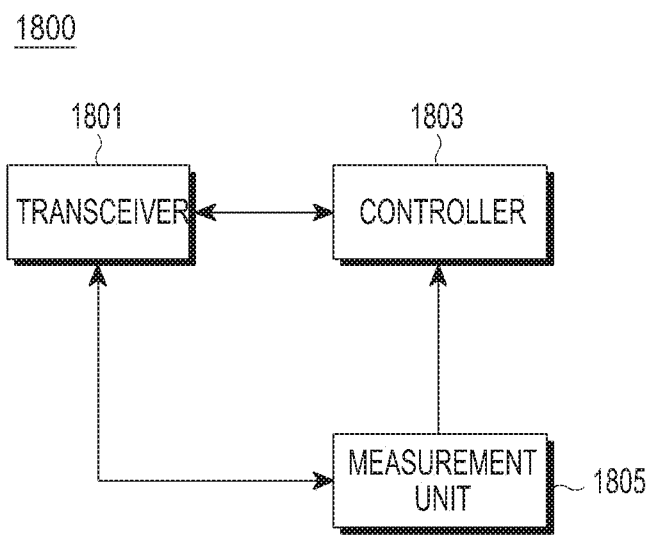
FIG. 18 is a view illustrating a UE device operating according to embodiments of the present disclosure.

FIG. 18 is a view illustrating a UE device operating according to embodiments of the present disclosure.

The UE device 1800 includes a transceiver 1801, a controller 1803, and a measurement unit 1805 and performs the foregoing embodiments of the present disclosure.

The controller 1803 controls overall operations of the base station device according to the embodiments of the present disclosure, the measurement unit 1805 generates a measurement according to the embodiments of the present disclosure, and the transceiver 1801 performs signal transmission and reception with a base station.

For example, the transceiver 1801 receives an activation command to activate at least one measurement gap allocated for the measurement of an unlicensed band among a plurality of measurement gaps set for the measurement of a licensed band, the controller 1803 acquires information on an activated measurement gap from the activation command, and the measurement unit 1805 measures the unlicensed band in the activated measurement gap and transmits a measurement result to the base station through the transceiver 1801.

The components of the UE device 1800 may perform operations according to the embodiments of the present disclosure as in the foregoing examples. A person skilled in the art can readily implement the foregoing embodiments of the present disclosure from the configuration of the UE device 1800, and thus detailed descriptions on embodiments in which the foregoing embodiments are implemented in the UE device 1800 are omitted for the convenience of description.

Specific aspects of the foregoing embodiments of the present disclosure may be implemented as computer readable codes in a computer readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The invention claimed is:

1. A method for receiving a measurement result of a user equipment (UE) by a base station in a wireless communication system, the method comprising:
receiving a measurement gap request message from the UE, when a signal strength of a licensed-band cell measured by the UE is a reference value or higher;
allocating, for measurement of an unlicensed band, at least one of a plurality of measurement gaps set for measurement of a licensed band in response to the measurement gap request message;
transmitting, to the UE, an activation command to activate the allocated at least one measurement gap for the measurement of the unlicensed band; and
receiving, from the UE, a measurement result of the unlicensed band that is measured by the UE in the activated at least one measurement gap.

2. The method as claimed in claim 1, further comprising:
transmitting, to the UE, measurement gap configuration information as information on the plurality of measurement gaps set for the measurement of the licensed band before the transmitting of the activation command.

3. The method as claimed in claim 1, wherein the transmitting of the activation command comprises transmitting the activation command and information on a channel in the unlicensed band used for the measurement of the unlicensed band.

4. The method as claimed in claim 1, wherein the transmitting of the activation command comprises transmitting the activation command and reference signal channel information on the unlicensed band that indicates whether a reference signal is transmitted in the unlicensed band.

5. The method as claimed in claim 1,
wherein the activation command is transmitted to the UE when at least one of condition 1, condition 2, and condition 3 is satisfied, and
wherein the condition 1 is that a serving channel of the UE is in a busy state, the condition 2 is that a number of channels in which a reference signal is currently transmitted is a predetermined number or higher, and the condition 3 is that a predetermined time elapses after the UE performs last inter-frequency measurement.

6. The method as claimed in claim 1,
wherein the reference value is determined based on a database preconfigured with respect to:
the signal strength of the licensed-band cell measured by the UE with respect to the cell that is allocated the licensed band, and
a signal strength of an unlicensed-band cell measured by the UE with respect to the cell that is allocated the unlicensed band.

7. A method for transmitting a measurement result by a user equipment (UE) in a wireless communication system, the method comprising:
transmitting a measurement gap request message to a base station, when a signal strength of a licensed-band cell measured by the UE is a reference value or higher;
receiving, from the base station, an activation command to activate at least one measurement gap for a measurement of an unlicensed band in response to the measurement gap request message, wherein the at least one measurement gap is at least one of a plurality of measurement gaps set for measurement of a licensed band;
measuring the unlicensed band in the activated at least one measurement gap based on the activation command; and
transmitting, to the base station, a measurement result of the unlicensed band.

8. The method as claimed in claim 7, further comprising:
receiving, from the base station, measurement gap configuration information as information on the plurality of measurement gaps set for the measurement of the licensed band before the receiving of the activation command.

9. The method as claimed in claim 7, wherein the receiving of the activation command comprises receiving the activation command and information on a channel in the unlicensed band used for the measurement of the unlicensed band.

10. The method as claimed in claim 7, wherein the receiving of the activation command comprises receiving the activation command and reference signal channel information on the unlicensed band that indicates whether a reference signal is transmitted in the unlicensed band.

11. The method as claimed in claim 7,
wherein the activation command is received from the base station when at least one of condition 1, condition 2, and condition 3 is satisfied, and
wherein the condition 1 is that a serving channel of the UE is in a busy state, the condition 2 is that a number of channels in which a reference signal is currently transmitted is a predetermined number or higher, and the condition 3 is that a predetermined time elapses after the UE performs last inter-frequency measurement.

12. The method as claimed in claim 7, wherein the reference value is determined based on a database preconfigured with respect to:
the signal strength of the licensed-band cell measured by the UE with respect to the cell that is allocated the licensed band, and
a signal strength of an unlicensed-band cell measured by the UE with respect to the cell that is allocated the unlicensed band.

13. A base station for receiving a measurement result of a user equipment (UE) in a wireless communication system, the base station comprising:
a transceiver configured to transmit or receive data; and
at least one processor configured to:
control to receive a measurement gap request message from the UE, when a signal strength of a licensed-band cell measured by the UE is a reference value or higher,
allocate, for measurement of an unlicensed band, at least one of a plurality of measurement gaps set for measurement of a licensed band in response to the measurement gap request message,
control to transmit, to the UE, an activation command to activate the allocated at least one measurement gap for the measurement of the unlicensed band, and
control to receive, from the UE, a measurement result of the unlicensed band that is measured by the UE in the activated at least one measurement gap.

14. The base station as claimed in claim 13, wherein the at least one processor is further configured to control to transmit, to the UE, measurement gap configuration information as information on the plurality of measurement gaps set for the measurement of the licensed band before the activation command is transmitted.

15. The base station as claimed in claim 13, wherein the at least one processor is further configured to control to transmit information on a channel in the unlicensed band used for the measurement of the unlicensed band.

16. The base station as claimed in claim 13, wherein the at least one processor is further configured to control to transmit reference signal channel information on the unlicensed band that indicates whether a reference signal is transmitted in the unlicensed band.

17. The base station as claimed in claim 13,
wherein the activation command is transmitted to the UE when at least one of condition 1, condition 2, and condition 3 is satisfied, and
wherein the condition 1 is that a serving channel of the UE is in a busy state, the condition 2 is that a number of channels in which a reference signal is currently transmitted is a predetermined number or higher, and the condition 3 is that a predetermined time elapses after the UE performs last inter-frequency measurement.

18. The base station as claimed in claim 13, wherein the reference value is determined based on a database preconfigured with respect to:
the signal strength of the licensed-band cell measured by the UE with respect to the cell that is allocated the licensed band, and
a signal strength of an unlicensed-band cell measured by the UE with respect to the cell that is allocated the unlicensed band.

* * * * *